United States Patent
Kojima

[11] Patent Number: 5,865,428
[45] Date of Patent: Feb. 2, 1999

[54] VIBRATION ISOLATING APPARATUS

[75] Inventor: Hiroshi Kojima, Yokohama, Japan

[73] Assignee: Bridgestone Corporation, Tokyo, Japan

[21] Appl. No.: 783,326

[22] Filed: Jan. 15, 1997

Related U.S. Application Data

[63] Continuation of Ser. No. 496,682, Jun. 29, 1995, abandoned.

[30] Foreign Application Priority Data

| Jul. 1, 1994 | [JP] | Japan | 6-150299 |
| Oct. 28, 1994 | [JP] | Japan | 6-265133 |

[51] Int. Cl.$^6$ .................................................. F16F 5/00
[52] U.S. Cl. ..................................... 267/140.14; 267/219
[58] Field of Search .................................. 267/218, 219, 267/140.11, 140.13, 140.14, 140.15, 35, 140.2, 140.5, 141.6, 141.7, 136, 300; 248/631, 636, 638, 562, 550; 180/312, 902; 251/129.15

[56] References Cited

U.S. PATENT DOCUMENTS

| 5,092,566 | 3/1992 | Freudenberg | 267/140.14 |
| 5,170,998 | 12/1992 | Muramatsu | 267/219 X |
| 5,205,546 | 4/1993 | Schisler et al. | 267/140.13 |
| 5,246,199 | 9/1993 | Numoto et al. | 251/129.15 |
| 5,314,173 | 5/1994 | Ide et al. | 267/140.14 |
| 5,386,977 | 2/1995 | Quast | 267/140.13 |
| 5,390,341 | 2/1995 | Takano et al. | 267/140.14 |
| 5,462,262 | 10/1995 | Gennesseaux | 267/140.14 X |

FOREIGN PATENT DOCUMENTS

| A-0 163 949 | 12/1985 | European Pat. Off. . | |
| A-0 440 260 | 8/1991 | European Pat. Off. . | |
| A-0 509 851 | 10/1992 | European Pat. Off. . | |
| A-0 598 188 | 5/1994 | European Pat. Off. . | |
| A-2 663 706 | 12/1991 | France . | |
| U-62-71431 | 5/1987 | Japan . | |
| 0145484 | 6/1989 | Japan | 251/129.15 |
| U-4-4545 | 1/1992 | Japan . | |
| A-04 321832 | 11/1992 | Japan . | |
| A-05 060171 | 3/1993 | Japan . | |
| 5149373 | 6/1993 | Japan | 267/140.15 |
| U-5-64553 | 8/1993 | Japan . | |
| 2269217 | 2/1994 | United Kingdom | 267/140.14 |

Primary Examiner—Robert J. Oberleitner
Assistant Examiner—Tyron Lee
Attorney, Agent, or Firm—Oliff & Berridge, PLC

[57] ABSTRACT

A vibration isolating apparatus includes: a first mounting member; a second mounting member; an elastic body provided between the first mounting member and the second mounting member; a main fluid chamber, the elastic body forming a portion of a partitioning wall of the main fluid chamber such that the main fluid chamber can expand and contract; a first auxiliary fluid chamber disposed so as to be separated from the main fluid chamber; a first restricting passage communicating the main fluid chamber and the first auxiliary fluid chamber; a second auxiliary fluid chamber disposed so as to be separated from the main fluid chamber; a second restricting passage communicating the main fluid chamber and the second auxiliary fluid chamber; a first diaphragm forming a portion of a partitioning wall of the first auxiliary fluid chamber; a second diaphragm forming a portion of a partitioning wall of the second auxiliary fluid chamber; an air chamber disposed in opposition to the second auxiliary fluid chamber with the second diaphragm being interposed between the air chamber and the second auxiliary fluid chamber, the air chamber being filled with air; and a switching valve which when open, communicates the air chamber with outside air, and when closed, closes the air chamber off from the outside air. Accordingly, an isolating characteristic can be varied at a low cost, and the characteristic can be maintained over time.

20 Claims, 13 Drawing Sheets

VIBRATION ISOLATING APPARATUS

This is a continuation of application Ser. No. 08/496,682 filed Jun. 29, 1995 now abandoned.

BACKGROUND OF THE INVENTION

1. Field of the Invention

The present invention relates to a vibration isolating apparatus which is used in a vehicle, an ordinary industrial machine or the like, and which absorbs vibration from a vibration generating portion.

2. Description of the Related Art

A vibration isolating apparatus serving as an engine mount is disposed between the engine and the vehicle body of a vehicle such as an automobile, and prevents the transmission of the engine vibration to the vehicle body.

Types of vibrations generated at the engine include so-called shake vibration which is generated when the vehicle is traveling at high speeds or the like, and so-called idle vibration which is generated when the vehicle is idling or is traveling at speeds of around 5 km/h.

The respective frequencies of shake vibration and idle vibration are different; generally, the frequency of shake vibration is less than 15 Hz, whereas the frequency of idle vibration is 20 to 50 Hz.

Fluid-filled vibration isolating apparatuses have been proposed as vibration isolating apparatuses which absorb and reduce shake vibration and idle vibration.

Such a fluid-filled vibration isolating apparatus is equipped with a main fluid chamber and a plurality of auxiliary fluid chambers. Portions of the wall surfaces of the main fluid chamber and the auxiliary fluid chambers are formed by an elastic body. The main fluid chamber and the auxiliary fluid chambers are connected by a plurality of restricting passages having respectively different sizes. Further, as is well-known, this type of vibration isolating apparatus reduces vibration by the fluid moving reciprocally within the restricting passages or resonating within the restricting passages when vibration is input.

The auxiliary fluid chamber of the vibration isolating apparatus is structured such that a diaphragm, whose opposite side contacts air, is a portion of a partitioning wall. Specifically, due to the diaphragm deforming, the volume of the auxiliary fluid chamber can be varied, and the fluid within the restricting passage communicating the main fluid chamber and the auxiliary fluid chamber can be made to move reciprocally. As a result, if the motion of the diaphragm is restricted, the fluid cannot flow within the restricting passage.

On the basis of this principle, fluid-filled vibration isolating apparatuses have been proposed in which the suction vacuum generated by the intake system of the engine is used to vary the isolating characteristic. In such a vibration isolating apparatus, an air chamber is provided at one surface side of the diaphragm, and the air chamber is connected to the intake system of the engine (e.g., an intake manifold) via a two-port/three-position switching valve (e.g., an electromagnetic valve). Accordingly, by communicating the intake system of the engine and the air chamber by the two-port/three-position switching valve, the internal pressure of the air chamber is lowered by the vacuum of the intake system of the engine, and the diaphragm is made to fit tightly to the inner wall of the air chamber.

In this way, fluid moves reciprocally in the restricting passages other than the restricting passage which is connected to the auxiliary fluid chamber facing the diaphragm which fits tightly to the inner wall, and an isolating effect is obtained.

However, the above-described vibration isolating apparatus has the following drawbacks.

First, a piping hose for supplying the vacuum generated by the engine intake system to the vibration isolating apparatus is needed. The piping hose results in added costs. Further, an assembly process for guiding and fixing the piping hose within the engine room is necessary, which results in an increase in manufacturing costs.

Second, in the event that the diaphragm breaks, there is the concern that the fluid within the vibration isolating apparatus will penetrate into the engine through the piping hose for the vacuum.

Third, when the diaphragm is sucked and is fit tightly to the inner wall of the air chamber due to the vacuum of the engine intake system, the fluid within the main fluid chamber moves to the auxiliary fluid chamber as the diaphragm moves. As a result, the volume of the main fluid chamber decreases, the elastic body caves in, and the position of a mounting member which is mounted to the elastic body changes. Specifically, there is a drawback in that the dimension between the vibration receiving portion and the vibration generating portion changes. For example, if the engine is supported at the vehicle body via the vibration isolating apparatus, the height of the engine varies.

Even in cases in which such a vibration isolating apparatus is used, when the engine starts, the idle rotational frequency of the engine increases and becomes a rotational frequency (for example, 900 to 1200 rpm) which is greater than or equal to the rotational frequency (around 700 rpm as illustrated in FIG. 13) which is set as the idle rotational frequency. Therefore, the vibration frequency becomes higher than ordinary idle frequency.

As a result, even if the vibration isolating apparatus is tuned in advance so as to match idle vibration, when the engine starts, the dynamic spring constant K increases, and vibration in the antiresonant region of the fluid is generated. A drawback arises in that the vibration cannot be reduced until the rotational frequency falls to less than or equal to the idle rotational frequency.

SUMMARY OF THE INVENTION

In view of the aforementioned, an object of the present invention is to provide a vibration isolating apparatus in which the isolating characteristic is variable at low cost, and in which the characteristic can be maintained over time.

Another object of the present invention is to provide a vibration isolating apparatus in which vibration can be reduced even when the engine is started.

In accordance with one aspect of the present invention, there is provided a vibration isolating apparatus comprising: a first mounting member connected to one of a vibration generating portion and a vibration receiving portion; a second mounting member connected to the other of the vibration generating portion and the vibration receiving portion; an elastic body provided between the first mounting member and the second mounting member and deforming when vibration is generated; a main fluid chamber filled with fluid, the elastic body forming a portion of a partitioning wall of the main fluid chamber such that the main fluid chamber is able to expand and contract; a first auxiliary fluid chamber disposed so as to be separated from the main fluid chamber; a first restricting passage communicating the main fluid chamber and the first auxiliary fluid chamber; a second auxiliary fluid chamber disposed so as to be separated from the main fluid chamber; a second restricting passage communicating the main fluid chamber and the second auxiliary fluid chamber; a first diaphragm forming a portion of a partitioning wall of the first auxiliary fluid chamber; a second diaphragm forming a portion of a partitioning wall of the second auxiliary fluid chamber; an air chamber disposed in opposition to the second auxiliary fluid chamber with the second diaphragm being interposed between the air chamber and the second auxiliary fluid chamber, the air chamber being filled with air; and a switching valve which when open, communicates the air chamber with outside air, and when closed, closes the air chamber off from the outside air, wherein the switching valve is a two-position, two-port switch valve (hereinafter referred to as a switching valve).

The following operation is achieved by such a vibration isolating apparatus. The vibration generated by the vibration generating portion is absorbed by the resistance based on the internal friction of the elastic body, and is absorbed by the transit resistance or fluid-column resonance of the fluid flowing in the restricting passage.

For example, if the first restricting passage is made longer and thinner than the second restricting passage and the rigidity of the first diaphragm is made smaller than that of the second diaphragm, low-frequency vibration, e.g., shake vibration, can be absorbed by resistance when the fluid moves reciprocally in the first restricting passage.

When vibration of a higher frequency than shake vibration is inputted, the first restricting passage becomes clogged. At this time, the fluid in the second restricting passage resonates, and the dynamic spring constant of the vibration isolating apparatus decreases, and the vibration can be absorbed. Here, the rigidity of the second diaphragm differs in a case in which the switching valve is open so that the air chamber and the outside air communicate, and in a case in which the switching valve is closed so that the air chamber and the outside air do not communicate.

Accordingly, when the switching valve is opened, the dynamic spring constant of the vibration isolating apparatus in a frequency region of a frequency higher than shake vibration, e.g., idle vibration, decreases. When the switching valve is closed, the dynamic spring constant of the vibration isolating apparatus in a frequency region of a frequency higher than idle vibration, e.g., shaking sound, decreases. Namely, the isolating characteristic of the vibration isolating apparatus is varied by the switching valve and by the air chamber being open or not being open to the outside air, so that vibrations over a wide frequency range can be absorbed.

Because the air of the air chamber is not sucked by the vacuum of the intake system of the engine, even if the diaphragm were to break, the fluid would not penetrate into the engine.

Further, because the diaphragm is not sucked, the fluid within the main fluid chamber is not sucked to the second auxiliary fluid chamber, the volume of the main fluid chamber does not decrease, the elastic body does not cave in, and the height of the vibration isolating apparatus does not decrease.

In accordance with another aspect of the present invention, there is provided a vibration isolating apparatus comprising: a first mounting member connected to one of a vibration generating portion and a vibration receiving portion; a second mounting member connected to the other of the vibration generating portion and the vibration receiving portion; an elastic body provided between the first mounting member and the second mounting member and deforming when vibration is generated; a main fluid chamber filled with fluid, the elastic body forming a portion of a partitioning wall of the main fluid chamber such that the main fluid chamber is able to expand and contract; a first auxiliary fluid chamber disposed so as to be separated from the main fluid chamber; a first restricting passage communicating the main fluid chamber and the first auxiliary fluid chamber; a second auxiliary fluid chamber disposed so as to be separated from the main fluid chamber; a second restricting passage communicating the main fluid chamber and the second auxiliary fluid chamber, a passage cross-sectional area of the second restricting passage being greater than a passage cross-sectional area of the first restricting passage and/or a passage length of the second restricting passage being shorter than a passage length of the first restricting passage; a first diaphragm forming a portion of a partitioning wall of the first auxiliary fluid chamber; a second diaphragm forming a portion of a partitioning wall of the second auxiliary fluid chamber; an air chamber disposed in opposition to the second auxiliary fluid chamber with the second diaphragm being interposed between the air chamber and the second auxiliary fluid chamber, the air chamber being filled with air; and a switching valve having an opening which communicates the air chamber and outside air, and having a valve element which can close the opening from an air chamber side.

Such a vibration isolating apparatus has the following operation. The present aspect has substantially the same operation as that of the previously-described aspect. However, in accordance with the present aspect, the switching valve has an opening, which communicates the air chamber and the outside air, and a valve element, which can close the opening from the air chamber side. As a result, the rigidity of the second diaphragm is different in a case in which the opening of the switching valve is open so that the air chamber and the outside air communicate, and in a case in which the opening is closed by the valve element so the air chamber and the outside air do not communicate.

In the case in which the opening is closed and the air chamber and the outside air do not communicate, the air in the air chamber functions as an air spring, and the rigidity of the second diaphragm increases. When the rigidity of the second diaphragm becomes high, the frequency at which the fluid resonates in the second restricting passage moves to the high frequency side.

For example, when idle vibration, which has a higher frequency than shake vibration, is generated, the valve element separates from the opening so that the air chamber and the outside air communicate. In this state, the frequency at which the fluid in the second restricting passage resonates moves to the low frequency side. Therefore, the dynamic spring constant of the vibration isolating apparatus in the frequency region of idle vibration decreases, and the idle vibration can be absorbed.

When, for example, shaking sound, which has a higher frequency than idle vibration, is generated, the valve element closes the opening. In this state, the frequency at which the fluid in the second restricting passage resonates moves to the high frequency side. Therefore, the dynamic spring constant of the vibration frequency apparatus in the high frequency region decreases, and the shaking sound can be absorbed.

By adjusting the rigidity of the second diaphragm and the size of the second restricting passage, low-frequency idle vibration and high-frequency idle vibration can be effectively absorbed.

Further, due to the motion of the engine, the internal pressure of the main fluid chamber and the second auxiliary fluid chamber may become great, and accordingly, the internal pressure of the air chamber may become extremely great. However, because the valve element closes the opening from the air chamber side, the valve element is pushed against the opening as the internal pressure of the air chamber rises so that so-called self-sealing occurs and the sealability is improved.

In accordance with yet another aspect of the present invention, there is provided a vibration isolating apparatus comprising: a first mounting member connected to one of an engine and a vehicle body; a second mounting member connected to the other of the engine and the vehicle body; an elastic body provided between the first mounting member and the second mounting member and deforming when vibration is generated; a main fluid chamber filled with fluid, the elastic body forming a portion of a partitioning wall of the main fluid chamber such that the main fluid chamber is able to expand and contract; a first auxiliary fluid chamber able to expand and contract, and communicating with the main fluid chamber via a first restricting passage; a second auxiliary fluid chamber communicating with the main fluid chamber via a second restricting passage; a diaphragm which is deformable and which forms a portion of a partitioning wall of the second auxiliary fluid chamber; an air chamber disposed in opposition to the second auxiliary fluid chamber with the diaphragm being interposed between the air chamber and the second auxiliary fluid chamber, the air chamber being filled with air; a switching valve adapted to assume an open state in which the air chamber communicates with outside air, and a closed state in which the air chamber is closed off from the outside air; a sensor for detecting a frequency of vibration generated by the engine; and control means for, on the basis of signals from the sensor, setting the switching valve in the open state when it is determined that the frequency of the vibration generated by the engine falls in a range of idle frequency, and setting the switching valve in the closed state when it is determined that the frequency of the vibration generated by the engine exceeds the range of idle frequency.

Such a vibration isolating apparatus has the following operation. The shake vibration generated by the engine is transmitted to the elastic body via the first mounting member or the second mounting member. At this time, the shake vibration is absorbed by resistance based on the internal friction of the elastic body. Further, the elastic body forms a portion of the partitioning wall of the main fluid chamber. The main fluid chamber expands and contracts, and the shake vibration is also absorbed by the transit resistance or the fluid-column resonance of the fluid flowing through the first restricting passage or the second restricting passage.

When idle vibration, whose frequency is higher than that of shake vibration, is inputted to the vibration isolating apparatus, the first restricting passage becomes clogged. At this time, fluid resonates in the second restricting passage, the dynamic spring constant of the vibration isolating apparatus decreases, and the idle vibration can be absorbed.

When high-frequency vibration, which has a higher frequency than idle vibration and which cannot be absorbed by the first restricting passage and the second restricting passage, is generated in the engine, the sensor detects that high-frequency vibration is being generated, and the control means operates the switching valve. The space between the outside air and the air chamber, which is positioned so as to oppose the second auxiliary fluid chamber with the diaphragm therebetween, is closed by the switching valve so that the closed state is achieved. In this way, the air within the air chamber functions as an air spring, and the rigidity of the diaphragm becomes greater than in the open state in which the valve is open and the air chamber and the outside air communicate.

As a result, the frequency at which the fluid resonates in the second restricting passage moves to the high frequency side, and the dynamic spring constant of the vibration isolating apparatus in a frequency region of high-frequency vibration decreases. Namely, the characteristic of the vibration isolating apparatus is varied by the switching valve and by the air chamber being open or not being open to the outside air. Vibrations can be absorbed over a wide frequency range.

When the engine starts, the rotational frequency of the engine increases to greater than or equal to a rotational frequency which is set as the idle rotational frequency, and the switching valve is set in the closed state in which the space between the air chamber and the outside air is closed. Accordingly, even if the characteristic of the vibration isolating apparatus is varied and the engine is started, vibration in an antiresonant region of the fluid is not generated, and the vibration can be absorbed even if the rotational frequency of the engine exceeds the idle rotational frequency.

Namely, when the switching valve is set in an open state, the dynamic spring constant of the vibration isolating apparatus in the frequency region of idle vibration decreases. When the switching valve is set in the closed state, the dynamic spring constant of the vibration isolating apparatus in a frequency region of a frequency higher than idle vibration, e.g., a frequency region in which shaking sound is generated, decreases.

DETAILED DESCRIPTION OF THE PREFERRED EMBODIMENTS

Figure 1:
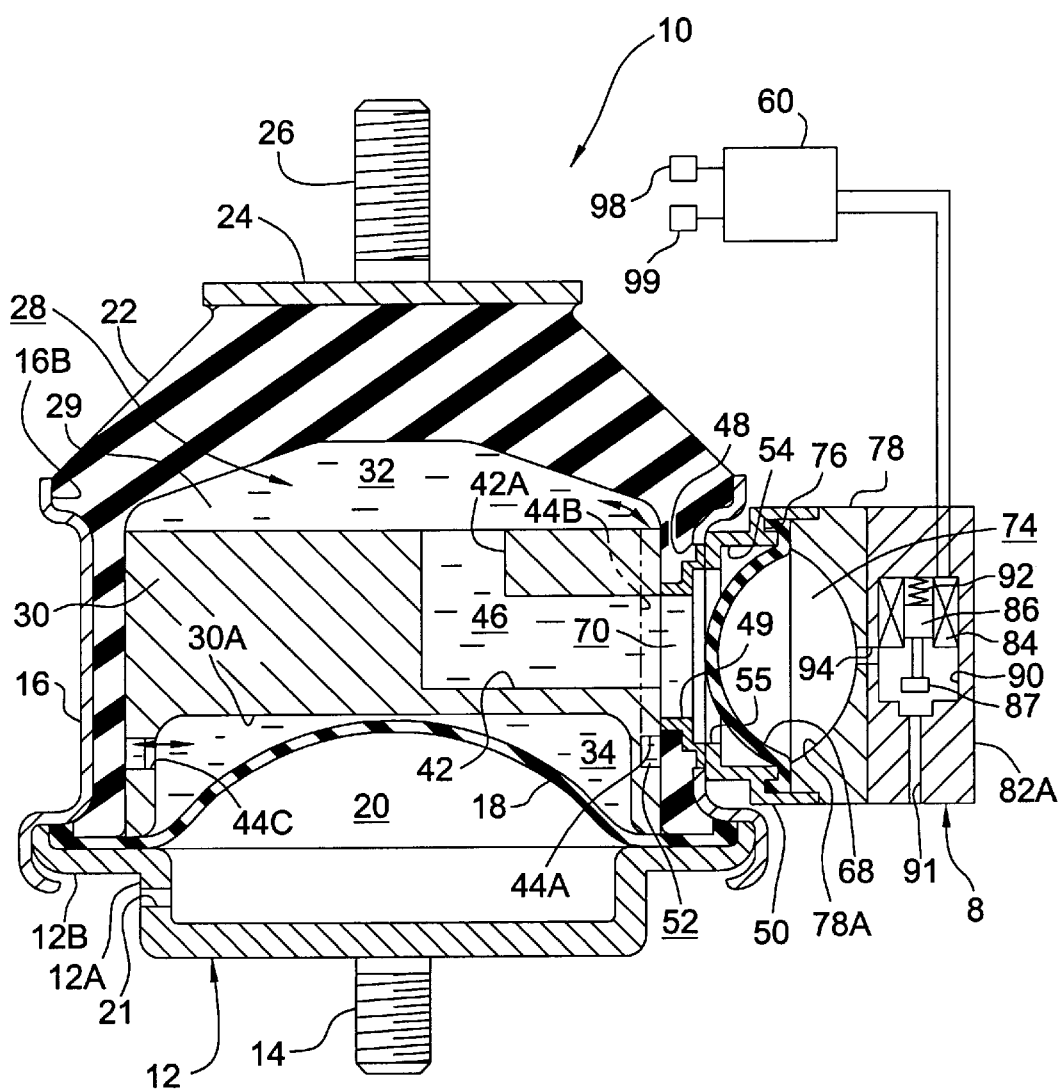
FIG. 1 is a sectional view of a vibration isolating apparatus relating to a first preferred embodiment of the present invention.
Figure 2:
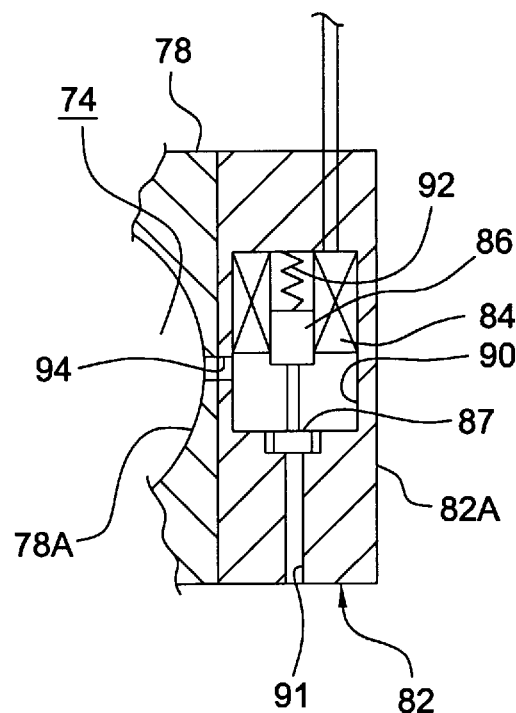
FIG. 2 is an enlarged sectional view of a switching valve used in the vibration isolating apparatus relating to the first preferred embodiment of the present invention, the view illustrating a closed state.
Figure 3:
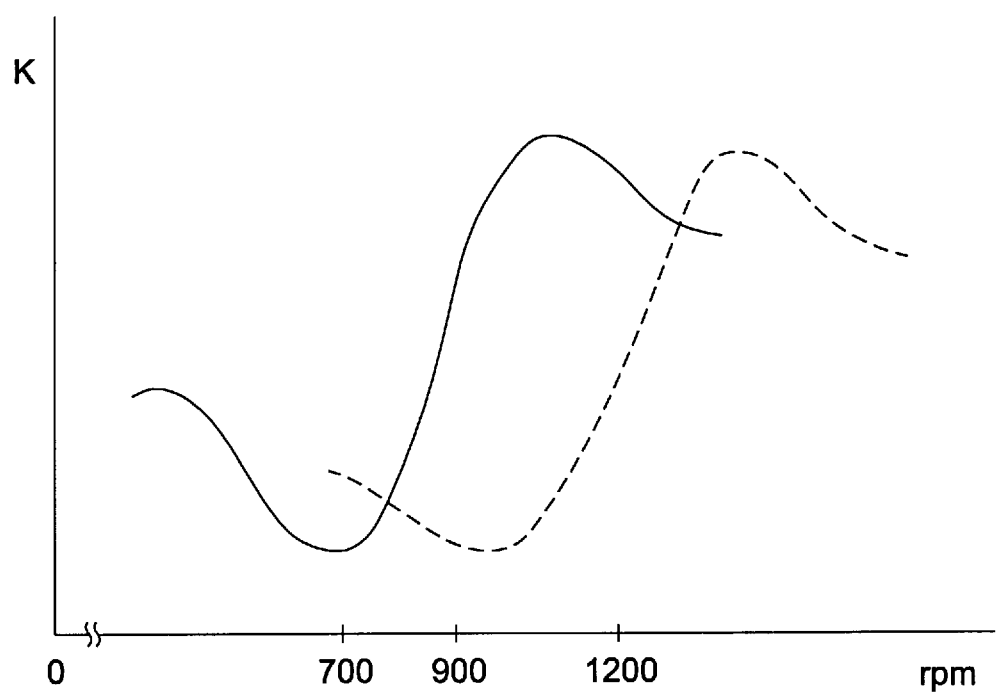
FIG. 3 is a graph illustrating a characteristic of the vibration isolating apparatus relating to the first preferred embodiment of the present invention.

A first preferred embodiment of a vibration isolating apparatus relating to the present invention is illustrated in FIGS. 1 through 3 and will be described on the basis of these figures.

As illustrated in FIG. 1, a vibration isolating apparatus 10 of the present embodiment includes a bottom plate 12 serving as a first mounting member. A mounting bolt 14 protrudes from a central lower portion of the bottom plate 12. The vibration isolating apparatus 10 is fixed to, for example, the vehicle body of an unillustrated automobile by using the mounting bolt 14. The periphery of the bottom plate 12 is formed as a tubular standing wall portion 12A which is bent perpendicularly. A flange portion 12B bent perpendicularly is formed so as to be connected to the upper end portion of the standing wall portion 12A.

The bottom end portion of a tubular outer tube 16 is fixed by caulking to the flange portion 12B of the bottom plate 12. The peripheral edge portion of a first diaphragm 18 is sandwiched between the flange portion 12B and the lower end portion of the outer tube 16. The space between the first diaphragm 18 and the bottom plate 12 is a first air chamber 20 which communicates with the exterior via an air hole 21 formed in the standing wall portion 12A.

The upper end portion of the inner peripheral surface of the outer tube 16 is an enlarged opening portion 16B whose inner diameter is enlarged. The outer periphery of an elastic body 22, which closes the opening portion of the outer tube 16, is bonded by vulcanization to the enlarged opening portion 16B. Further, a portion of the elastic body 22 extends to the lower end portion of the inner periphery of the outer tube 16, and the outer peripheral side of the elastic body 22 is bonded by vulcanization to the outer tube 16.

A supporting stand 24 serving as a second mounting member is bonded by vulcanization to the center of the elastic body 22. The supporting stand 24 is a loading portion for an unillustrated engine, and a mounting bolt 26 for fixing the engine is formed upright from the supporting stand 24.

A fluid chamber 28 is formed by the inner peripheral portion of the outer tube 16, the lower end portion of the elastic body 22, the first diaphragm 18 and the like. A fluid 29 such as ethylene glycol or the like is filled in the fluid chamber 28.

An orifice member 30, which is a circular-column-shaped partitioning member formed of synthetic resin or the like, is disposed within the fluid chamber 28, so that the fluid chamber 28 is partitioned into a main fluid chamber 32 and a first auxiliary fluid chamber 34. A concave portion 30A is formed at the first auxiliary fluid chamber 34 side of the orifice member 30.

A thin groove 44A having a rectangular cross-section is formed in the outer periphery of the orifice member 30 along the peripheral direction thereof. A thin groove 44B which extends to the upper surface of the orifice member 30 is connected to one end of the thin groove 44A. An opening portion 44C which penetrates to the concave portion 30A is connected to the other end of the thin groove 44A. The outer tube 16 sides of the thin grooves 44A, 44B are closed by an extended portion of the elastic body 22, so as to form a first restricting passage 52 communicating between the main fluid chamber 32 and the first auxiliary fluid chamber 34.

A rectangular hole 42, which extends toward the center of the orifice member 30 from the outer periphery, is formed in the orifice member 30. A illustrated in FIG. 1, the lead end of the rectangular hole 42 is bend upwardly so as to form a second restricting passage 46 communicating with the main fluid chamber 32 via an opening portion 42A.

A through hole 48 is formed at a position of the side surface of the outer tube 16 which position corresponds to the rectangular hole 42 of the orifice member 30. A block 50 is mounted to the outer peripheral surface of the outer tube 16 corresponding to the through hole 48.

A concave portion 54 is formed in the block 50. A through hole 55, which is coaxial with the through hole 48 of the outer tube 16, is formed in the center of the bottom portion of the concave portion 54. A frame-shaped communicating member 49, which penetrates through the elastic body 22 and communicates with the through hole 55 of the block 50 and the rectangular hole 42 of the orifice member 30, is inserted into the through hole 48 of the outer tube 16.

An annular concave portion 76 is formed at a portion of the block 50 at the outer peripheral side of the opening portion of the concave portion 54. The peripheral edge portion of a second diaphragm 68 is sandwiched between the annular concave portion 76 and the block 78. In a free state, the second diaphragm 68 protrudes substantially hemispherically toward the concave portion 54. The concave portion 54 is closed by the second diaphragm 68 so as to form a second auxiliary fluid chamber 70.

A substantially hemispherical concave portion 78A is formed at the surface of the block 78 which surfaces faces the second diaphragm 68. A second air chamber 74 is formed between the concave portion 78A and the second diaphragm 68.

A main body 82A of a switching valve 82 is mounted to a portion of the block 78 at the opposite side of the block 50. The switching valve is a two-position, two-port switch valve (hereinafter referred to as a switching valve). A housing chamber 90, which houses a coil 84, a plunger 86 serving as a movable core, and a spring 92, is provided at the main body 82A. A hole 94 which communicates the second air chamber 74 and the housing chamber 90 is formed in the main body 82A and the block 78. Further, an air hole 91 serving as an opening which communicates the housing chamber 90 with the outside air is formed in the main body 82A. A circular-plate-shaped valve element 87 is mounted to the lead end of the plunger 86.

When a predetermined voltage is applied to the coil 84, as illustrated in FIG. 1, the plunger 86 is attracted by electromagnetic force generated by the coil 84, and the valve element 87 separates from the air hole 91. On the other hand, when voltage is not applied to the coil 84, as illustrated in FIG. 2, the valve element 87 is urged by the spring 92 serving as an urging means, and covers the air hole 91. An elastic body (unillustrated), such as rubber or the like, for improving the sealability of the air hole 91 is fixed to the air hole 91 side of the valve element 87.

The coil 84 is connected to a control circuit 60 which is a control means which turns the applied voltage on and off.

The control circuit 60 is driven by the power source of the vehicle, and receives detection signals from at least a vehicle speed sensor 98 and an engine rotational frequency sensor 99 so as to be able to detect the vehicle speed and the engine rotational frequency. In this way, the control circuit 60 can determine when the vehicle is idling, when the vehicle is shaking, or when the vehicle is generating shaking sound.

The passage length of the first restricting passage 52 is longer than that of the second restricting passage 46. The passage cross-sectional area of the first restricting passage 52 is smaller than that of the second restricting passage 46.

The respective rigidities of the first diaphragm 18 and the second diaphragm 68 are different. The rigidity of the second diaphragm 68 is higher than that of the first diaphragm 18.

The fluid-column resonance frequencies at the restricting passages are determined by the sizes of the restricting passages and by the rigidities of the diaphragms. By varying the value of the rigidity of the second diaphragm 68, the fluid-column resonance frequency at the second restricting passage 46 can be changed.

Operation of the embodiment will be described hereinafter.

The bottom plate 12 of the vibration isolating apparatus 10 is fixed to the vehicle body of a vehicle such as an automobile or the like. When the engine is loaded on the supporting stand 24 and fixed thereto, the engine is supported to the vehicle body of the automobile via the supporting stand 24, the elastic body 22, the outer tube 16 and the bottom plate 12. Vibration is absorbed by resistance based on the internal friction of the elastic body 22.

When the vehicle is traveling at, for example, 70–80 km/h, shake vibration (e.g., vibration of a frequency less than 15 Hz) is generated. At this time, the control circuit 60 determines from the vehicle speed sensor 98 and the engine rotational frequency sensor 99 that shake vibration is being generated, and voltage is not applied to the coil 84. In this way, the plunger 86 is urged by the spring 92, the air hole 91 is closed by the valve element 87, and the switching valve 82 is in a closed state, closing the space between the second air chamber 74 and the outside air.

As a result, because the air within the second air chamber 74 functions as an air spring, the rigidity of the second diaphragm 68 increases.

At this time, the fluid 29 moves reciprocally between the main fluid chamber 32 and the first auxiliary fluid chamber 34 through the first restricting passage 52. Damping force is generated by resistance at the time when the fluid 29 passes through the first restricting passage 52, and the shake vibration is effectively absorbed. When shake vibration is generated, the second diaphragm 68 which has high rigidity hardly deforms at all, and there is hardly any flow of the fluid 29 through the second restricting passage 46.

Further, when the engine is idling or the vehicle speed is 5 km/h or less, idle vibration (e.g., vibration of a frequency of 20 to 50 Hz) is generated. Accordingly, the set frequency can be set in advance to, for example, 50 Hz.

When idle vibration is generated, the first restricting passage 52 becomes clogged. The control circuit 60 determines from the vehicle speed sensor 98 and the engine rotational frequency sensor 99 that idle vibration is being generated. The control circuit 60 applies voltage to the coil 84 of the switching valve 82, and the plunger 86 is attracted. In this way, the valve element 87 separates from the air hole 91, and the second air chamber 74 is set in an open state in which the second air chamber 74 is open to the outside air. The dynamic spring constant of the vibration isolating apparatus 10 at the vibration frequency region of idle vibration decreases, and the idle vibration is reliably absorbed.

Further, at vehicle speeds of 100 km/h or more or when the engine rotational frequency is 3000 rpm or more or in other such cases, shaking sound (e.g., vibration whose frequency is in the vicinity of 80 Hz) is generated. In this case, the control circuit 60 determines from the vehicle speed sensor 98 and the engine rotational frequency sensor 99 that shaking sound is being generated, and stops the application of voltage to the coil 84. In this way, the plunger 86 is urged by the spring 92, the valve element 87 closes the air hole 91, and the switching valve 82 is set in a closed state in which the space between the second air chamber 74 and the outside air is closed.

As a result, because the air within the second air chamber 74 functions as an air spring, the rigidity of the second diaphragm 68 increases. In this way, the fluid-column resonance frequency at the second restricting passage 46 moves to the high frequency side. The dynamic spring constant at the frequency region of vibration at the time the rotational frequency of the engine is high decreases, and the shaking sound is reliably damped.

Further, when the engine is started, the rotational frequency of the engine rises to greater than or equal to the rotational frequency which is set as the idle rotational frequency (e.g., 700 rpm). In addition, when the control circuit 60 determines that the rotational frequency of the engine is high from the signals sent from the vehicle speed sensor 98 and the engine rotational frequency sensor 99, the control circuit 60 stops the application of voltage to the coil 84. In this way, the plunger 86 is urged by the spring 92, and the valve element 87 closes the air hole 91. The switching valve 82 is set in a closed state in which the space between the second air chamber 74 and the outside air is closed.

As a result, the rigidity of the second diaphragm 68 increases. The fluid-column resonance frequency at the second restricting passage 46 thereby moves toward the high frequency side. The dynamic spring constant in the frequency region of vibration at the time the engine is started decreases, and the vibration is reliably absorbed.

More specifically, by moving from the open state to the closed state, the characteristic of the vibration isolating apparatus 10 varies from the solid line state to the dotted line state in FIG. 3. Therefore, even if high rotational frequencies of around 900 to 1200 rpm at the time the vehicle is started are generated in the engine, the dynamic spring constant K decreases, and vibration in the antiresonant region of the fluid is not generated. As a result, even if the rotational frequency of the engine exceeds idle rotational frequency, the vibration is absorbed.

Namely, when the switching valve 82 is set in the open state, the dynamic spring constant of the vibration isolating apparatus 10 in the frequency region of ordinary idle vibration decreases. When the switching valve 82 is set in the closed state, the dynamic spring constant of the vibration isolating apparatus 10 in the frequency region of shaking sound and in a frequency region of frequencies higher than idle vibration at the time the engine is started decreases.

In this way, in the vibration isolating apparatus 10 of the present embodiment, the isolating characteristic can be varied by the second air chamber 74 being open or not being open to the outside air. Because the air in the second air chamber 74 facing the fluid is not sucked by the intake system of the engine, even if the second diaphragm 68 were to break, there would not be any effect whatsoever on the engine. Further, because there is no sucking of the second diaphragm 68, there is no change in the volume within the main fluid chamber 32, and there is no change in the height of the vibration isolating apparatus 10.

The internal pressure of the main fluid chamber 32 varies greatly in accordance with the vibration of the engine and the shaking of the vehicle. When the valve element 87 closes the air hole 91, the internal pressure of the second air chamber 74 varies as the internal pressure of the main fluid chamber 32 varies, and there are cases in which the internal pressure of the second air chamber 74 becomes greater than or less than atmospheric pressure.

With regard to the difference between the internal pressure of the second air chamber 74 and atmospheric pressure, when the internal pressure of the second air chamber 74 becomes greater than atmospheric pressure, the internal pressure of the second air chamber 74 becomes several atm higher than atmospheric pressure. When the internal pressure of the second air chamber 74 becomes less than atmospheric pressure, the difference between the internal pressure of the second air chamber 74 and atmospheric pressure is at most less than 1 atm.

In the present embodiment, the valve element 87 closes the air hole 91 from the second air chamber 74 side. As a result, even if the internal pressure of the second air chamber 74 becomes extremely high, the valve element 87 is strongly pressed against the air hole 91 as the internal pressure rises. Therefore, the air in the second air chamber 74 does not leak out to the outside air. On the other hand, even if the internal pressure of the second air chamber 74 decreases, the difference between the internal pressure and atmospheric pressure is less than 1 atm. Therefore, the valve element 87 reliably closes the air hole 91 due to the spring 92 which has a predetermined urging force, and flow of air to the outside can be prevented.

In this way, when the valve element 87 closes the air hole 91, the second air chamber 74 is reliably closed. The isolating characteristic does not vary, and the characteristic can be ensured over time.

In the present embodiment, the passage cross-sectional area of the second restricting passage 46 is greater than that of the first restricting passage 52 and the passage length of the second restricting passage 46 is shorter than that of the first restricting passage 52. However, for example, it suffices if only the passage cross-sectional area of the second restricting passage 46 is greater than that of the first restricting passage 52, or if only the passage length of the second restricting passage 46 is shorter than that of the first restricting passage 52.

Next, a second preferred embodiment of the present invention will be described in accordance with FIGS. 4 through 6. Structures which are the same as those of the first embodiment are denoted by the same reference numerals, and description thereof is omitted.

Figure 4:
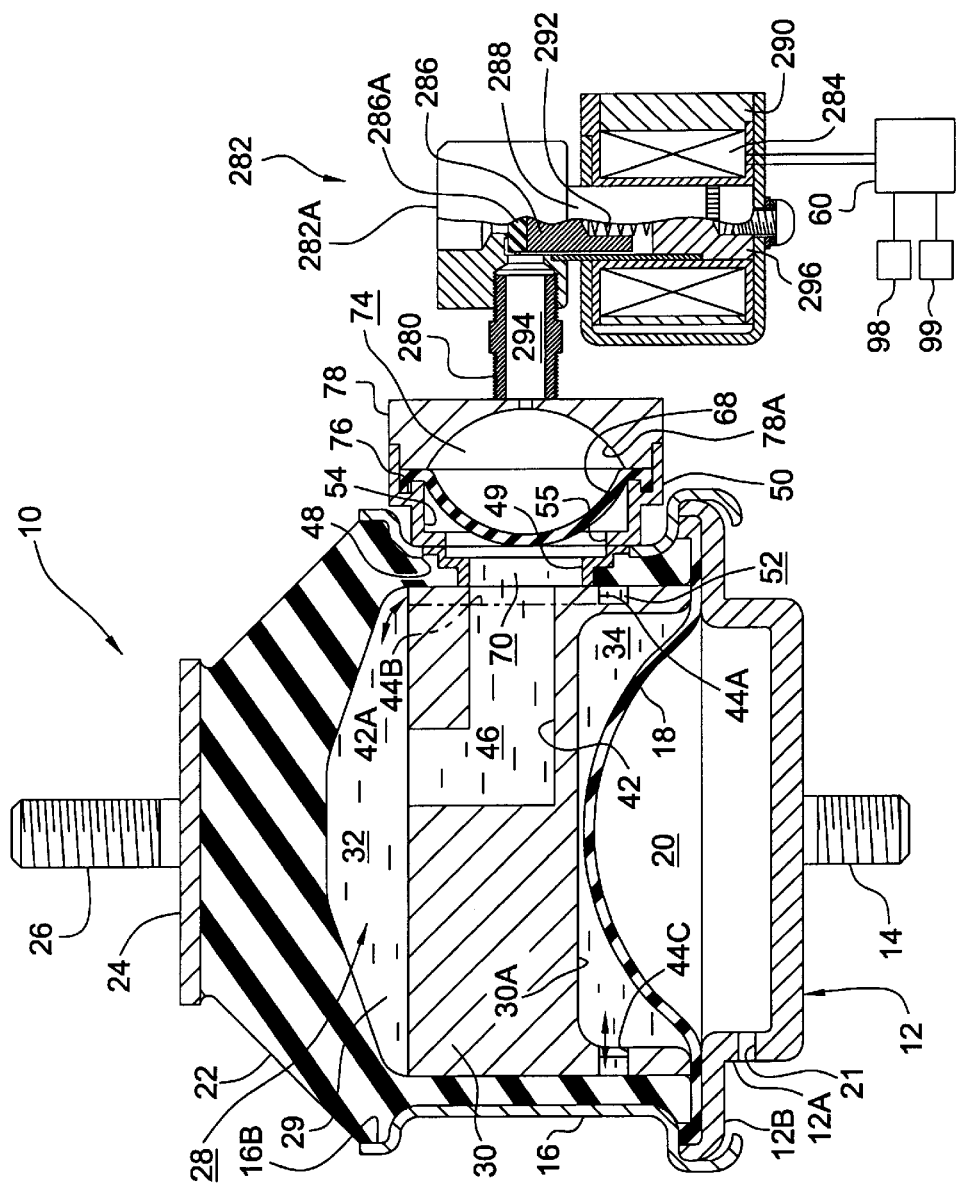
FIG. 4 is a sectional view of a vibration isolating apparatus relating to a second preferred embodiment of the present invention.

As illustrated in FIG. 4, the main body portion of the vibration isolating apparatus 10 of the second preferred embodiment is structured in the same way as that of the first preferred embodiment.

Figure 5:
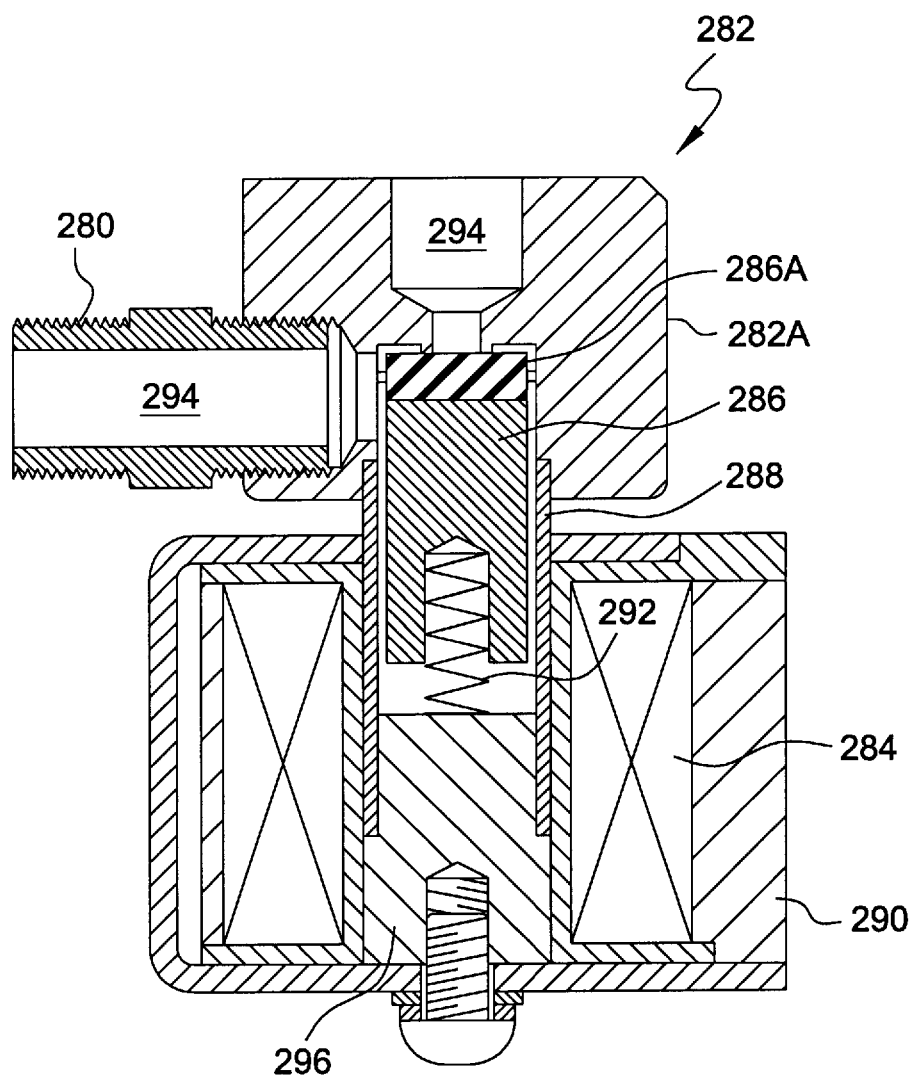
FIG. 5 is an enlarged sectional view of a switching valve used in the vibration isolating apparatus relating to the second preferred embodiment of the present invention, the view illustrating a closed state.
Figure 6:
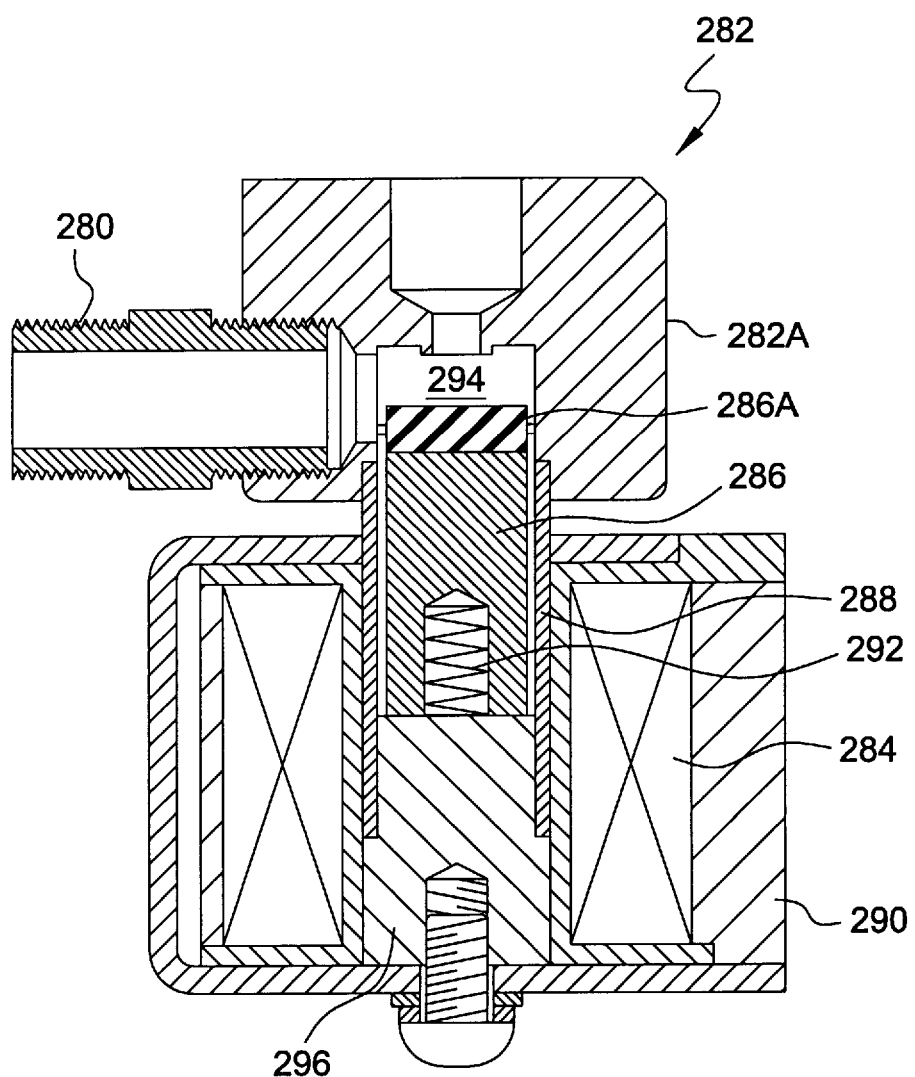
FIG. 6 is an enlarged sectional view of the switching valve used in the vibration isolating apparatus relating to the second preferred embodiment of the present invention, the view illustrating an open state.

In the second embodiment, the main body 282A of a switching valve 282 illustrated in FIGS. 4 through 6 is mounted via a connecting tube 280 to a portion of the block 78 at the side opposite the block 50. A coil housing body 290 which houses a coil 284 is connected to the main body 282A via a tube 288. A plunger 286 is movably disposed within the tube 288. A spring 292 is disposed between the proximal end of the plunger 286 and an attraction element 296 disposed within the coil housing body 290. Packing 286A is attached to the distal end of the plunger 286. An L-shaped through path 294, which penetrates through the connecting tube 280 and through the main body 282A of the switching valve 282 and which communicates the second air chamber 74 with the outside air, can be closed by the packing 286A.

Accordingly, in a case in which voltage is not applied to the coil 284, as illustrated in FIG. 5, the plunger 286 is urged by the spring 292, and the packing 286A closes the through path 294. On the other hand, in a case in which a predetermined voltage is applied to the coil 284, as illustrated in FIG. 6, the plunger 286 is attracted toward the attraction element 296 by the electromagnetic force generated by the coil 284. The packing 286A of the distal end of the plunger 286 draws away, and the through path 294 is opened.

The coil 284 is connected to the control circuit 60 which turns the applied voltage on and off. The control circuit 60 is driven by the power source of the vehicle, and receives detection signals from at least the vehicle speed sensor 98 and the engine rotational frequency sensor 99 so as to be able to detect the vehicle speed and the engine rotational frequency. In this way, the control circuit 60 can determine when the vehicle is idling, when the vehicle is shaking or when the vehicle is generating shaking sound.

There exists a gap between the plunger 286 and the tube 288 as illustrated in FIGS. 5–6. Air can flow into the space between the plunger 286 and the attraction element 296. Accordingly, when the through path 294 is closed by the plunger 286, air passes through the gap between the plunger 286 and the tube 288 so as to flow from the second air chamber 74 into the space between the plunger 286 and the attraction element 296. Due to the operation of the pressure of the air, the switching valve 282 can be securely closed.

Next, operation of the second preferred embodiment will be described.

In the same way as in the first embodiment, when shake vibration is generated, the control circuit 60 does not apply voltage to the coil 284. In this way, the plunger 286 is urged by the spring 292, and the packing 286A at the distal end of the plunger 286 closes the through path 294. The switching valve 282 is set in a closed state in which the space between the second air chamber 74 and the outside air is closed. As a result, because the air within the second air chamber 74 functions as an air spring, the rigidity of the second diaphragm 68 increases.

At this time, in the same way as in the first preferred embodiment, the fluid 29 moves reciprocally between the main fluid chamber 32 and the first auxiliary fluid chamber 34 through the first restricting passage 52. Damping force is generated by the resistance at the time the fluid 29 passes through the first restricting passage 52, and the shake vibration is effectively absorbed.

When idle vibration is generated, the control circuit 60 applies voltage to the coil 284 of the switching valve 282, and the plunger 286 is attracted. The packing 286A thereby moves apart from the through path 294, and the second air chamber 74 is set in a open state in which it is open to the outside air. The dynamic spring constant of the vibration isolating apparatus 10 in the vibration frequency region of idle vibration decreases, and the idle vibration is reliably absorbed.

When shaking sound is generated, the control circuit 60 stops the application of voltage to the coil 284. In this way, the plunger 286 is urged by the spring 292, the packing 286A closes the through path 294, and the switching valve 282 is set in a closed state, closing the space between the second air chamber 74 and the outside air.

As a result, because the air within the second air chamber 74 functions as an air spring, the rigidity of the second diaphragm 68 increases. The fluid-column resonance frequency at the second restricting passage 46 thereby moves to the high frequency side. The dynamic spring constant of the frequency region of vibration at the time the rotational frequency of the engine is high decreases, and the shaking sound is reliably absorbed.

A third preferred embodiment of the present invention will now be described in accordance with FIG. 7. Structures which are the same as those of the first embodiment are denoted by the same reference numerals, and description thereof is omitted.

Figure 7:
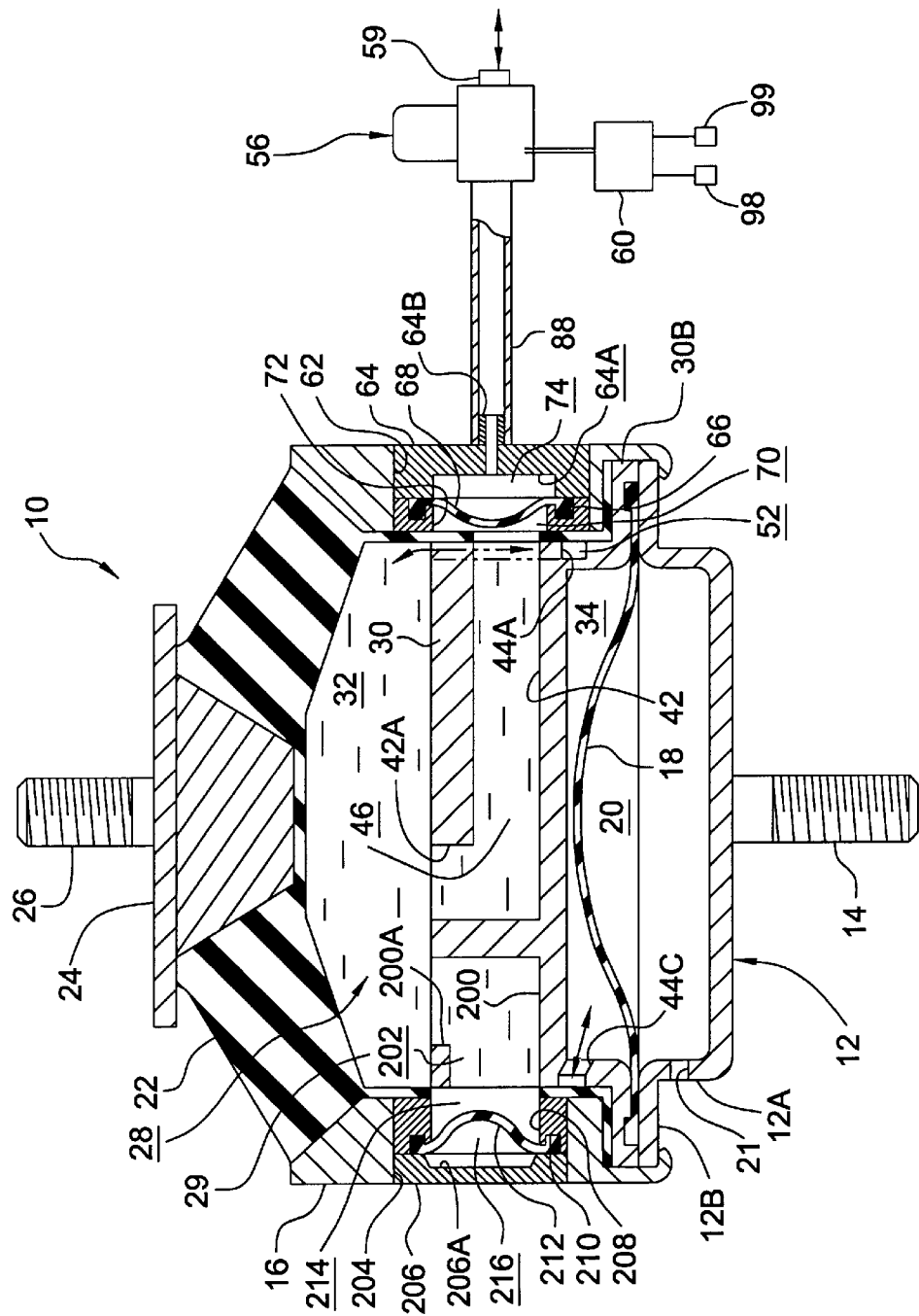
FIG. 7 is a sectional view of a vibration isolating apparatus relating to a third preferred embodiment of the present invention.

As illustrated in FIG. 7, the outer tube 16 of the vibration isolating apparatus 10 relating to the present embodiment is formed as a thick circular tube, and a portion of the lower portion thereof is thin. A flange 30B is provided at the lower portion of the orifice member 30 of the vibration isolating apparatus 10.

Further, the flange 30B of the orifice member 30 and the peripheral edge portion of the first diaphragm 18 are sandwiched between the flange portion 12B of the bottom plate 12 and the bottom edge portion of the thick portion of the outer tube 16, and are fixed to the thin portion of the outer tube 16 by caulking.

A concave portion 62 is formed at a position of the outer peripheral side of the outer tube 16 which position corresponds to the rectangular hole 42 of the orifice member 30. The concave portion 62 is closed by a block 64. A through hole 72 is formed in the bottom portion of the concave portion 62, and communicates with the rectangular hole 42.

An annular concave portion 66 is formed at the bottom portion of the concave portion 62 at the outer peripheral side of the through hole 72. The peripheral edge portion of the second diaphragm 68 is sandwiched between the annular concave portion 66 and the block 64. In a free state, the second diaphragm 68 protrudes substantially hemispherically toward the through hole 72. The through hole 72 is closed by the second diaphragm 68 so as to form the second auxiliary fluid chamber 70. A concave portion 64A is formed at the side of the block 64 facing the second diaphragm 68 so that the second air chamber 74 is formed between the concave portion 64A and the second diaphragm 68.

A tube portion 64B communicating with the second air chamber 74 is attached to the block 64. One end of a pipe 88 is connected to the tube portion 64B. The other end of the pipe 88 is connected to a two-port/two-position switching valve 56 which serves as a switching valve. The pipe 88 is merely connected to the second air chamber 74 and to the two-port/two-position switching valve 56. Making the pipe 88 as short as possible is preferable from the standpoints of cost and assembly. Note that the second air chamber 74 and the two-port/two-position switching valve 56 may be directly connected without using the pipe 88.

In addition to the pipe 88, a pipe 58 which communicates with the outside air is also connected to the two-port/two-position switching valve 56. The two-port/two-position switching valve 56 is connected to the control circuit 60 which is connected to the vehicle speed sensor 98 and the engine rotational speed sensor 99. The opening and closing of the two-port/two-portion switching valve 56 are controlled by the control circuit 60.

A rectangular hole 200, which extends from the outer periphery of the orifice member 30 toward the rectangular hole 42, is formed at a portion of the orifice member 30 at the side opposite the rectangular hole 42. The lead end side of the rectangular hole 200 bends upward and communicates with the main fluid chamber 32 via an opening portion 200A. Therefore, the rectangular hole 200 and the opening portion 200A form a third restricting passage 202.

A concave portion 204 is formed at a position of the outer periphery of the outer tube 16 which position corresponds to the rectangular hole 200 of the orifice member 30. The concave portion 204 is closed by a block 206. A through hole 208 is formed at the bottom portion of the concave portion 204, and communicates with the rectangular hole 200.

An annular concave portion 210 is formed at the bottom portion of the concave portion 204 at the outer peripheral side of the through hole 208. The peripheral edge portion of the third diaphragm 212 is sandwiched between the annular concave portion 210 and the block 206. In a free state, the third diaphragm 212 protrudes substantially hemispherically toward the through hole 208. The through hole 208 is closed by the third diaphragm 212 so as to form a third auxiliary fluid chamber 214. Further, a concave portion 206A is formed in the surface of the block 206 which faces the third diaphragm 212. A third air chamber 216 is formed between the concave portion 206A and the third diaphragm 212. The third air chamber 216 does not communicate with the outside air.

Here, the respective sizes of the first restricting passage 52, the second restricting passage 46, and the third restricting passage 202 are different. The respective passage lengths become smaller in order from the first restricting passage 52, the second restricting passage 46 and the third restricting passage 202. The respective passage cross-sectional areas become larger in order from the first restricting passage 52, the second restricting passage 46 and the third restricting passage 202.

The respective rigidities of the first diaphragm 18, the second diaphragm 68 and the third diaphragm 212 are different. The respective rigidities become higher in order from the first diaphragm 18, the second diaphragm 68, and the third diaphragm 212.

Operation of the third preferred embodiment will be described hereinafter.

When shake vibration is generated, the control circuit 60 closes the two-port/two-position switching valve 56 so as to close the space between the second air chamber 74 and the outside air. As a result, because the air within the second air chamber 74 functions as an air spring, the rigidity of the second diaphragm 68 increases.

The shake vibration is effectively absorbed by the resistance at the time the fluid 29 passes through the first restricting passage 52. When shake vibration is generated, the second diaphragm 68 and the third diaphragm 212 which have high rigidities hardly deform at all, and there is hardly any flow of the fluid 29 in the second restricting passage 46 and the third restricting passage 202.

When idle vibration is generated, the first restricting passage 52 becomes clogged. Therefore, the fluid 29 moves reciprocally between the main fluid chamber 32 and the second auxiliary fluid chamber 70 through the second restricting passage 46, and fluid-column resonance is generated in the second restricting passage 46. When idle vibration is generated, the third diaphragm 212 having high rigidity hardly deforms, and there is hardly any flow of the fluid 29 in the third restricting passage 202.

Here, due to the vehicle speed sensor 98 and the engine rotational frequency sensor 99, the control circuit 60 determines whether the frequency of the vibration is on the low end or the high end of idle vibration. When the control circuit 60 determines that the frequency of the vibration is on the low end, the control circuit 60 opens the two-port/two-position switching valve 56 so that the second air chamber 74 communicates with the outside air. In this way, the rigidity of the second diaphragm 68 is low as compared to a case in which the second air chamber 74 is closed. The dynamic spring constant of the vibration isolating apparatus 10 in the frequency range of low-frequency idle vibration decreases, and the low-frequency idle vibration is reliably absorbed.

When it is determined that the frequency of the vibration is on the high end of idle vibration, the control circuit 60 closes the two-port/two-position switching valve 56 so that the second air chamber 74 does not communicate with the outside air. In this way, the rigidity of the second diaphragm 68 becomes high, and the fluid-column resonance frequency at the second restricting passage 46 moves to the high frequency side. The dynamic spring constant of the vibration isolating apparatus 10 in the frequency region of high-frequency idle vibration decreases, and the high-frequency idle vibration is reliably absorbed.

High-frequency vibration (e.g., vibration whose frequency is in the vicinity of 80 Hz) which is a cause of shaking sound is generated in a case in which the vehicle speed is 100 km/h or more, or in a case in which the engine rotational frequency is 3000 rpm or more or in other such cases. At this time, the second restricting passage 46 becomes clogged, and fluid-column resonance is generated at the third restricting passage 202. The dynamic spring constant of the frequency region of high-frequency vibration thereby decreases, and the high-frequency vibration is reliably absorbed.

In the vibration isolating apparatus 10 of the present embodiment, both low-frequency idle vibration and high-frequency idle vibration can be addressed by the second air chamber 74 being open or not being open to the outside air.

Next, a fourth preferred embodiment of the present invention will be described in accordance with FIG. 8. Structures which are the same as those of the first through the third embodiments are denoted by the same reference numerals and description thereof is omitted.

Figure 8:
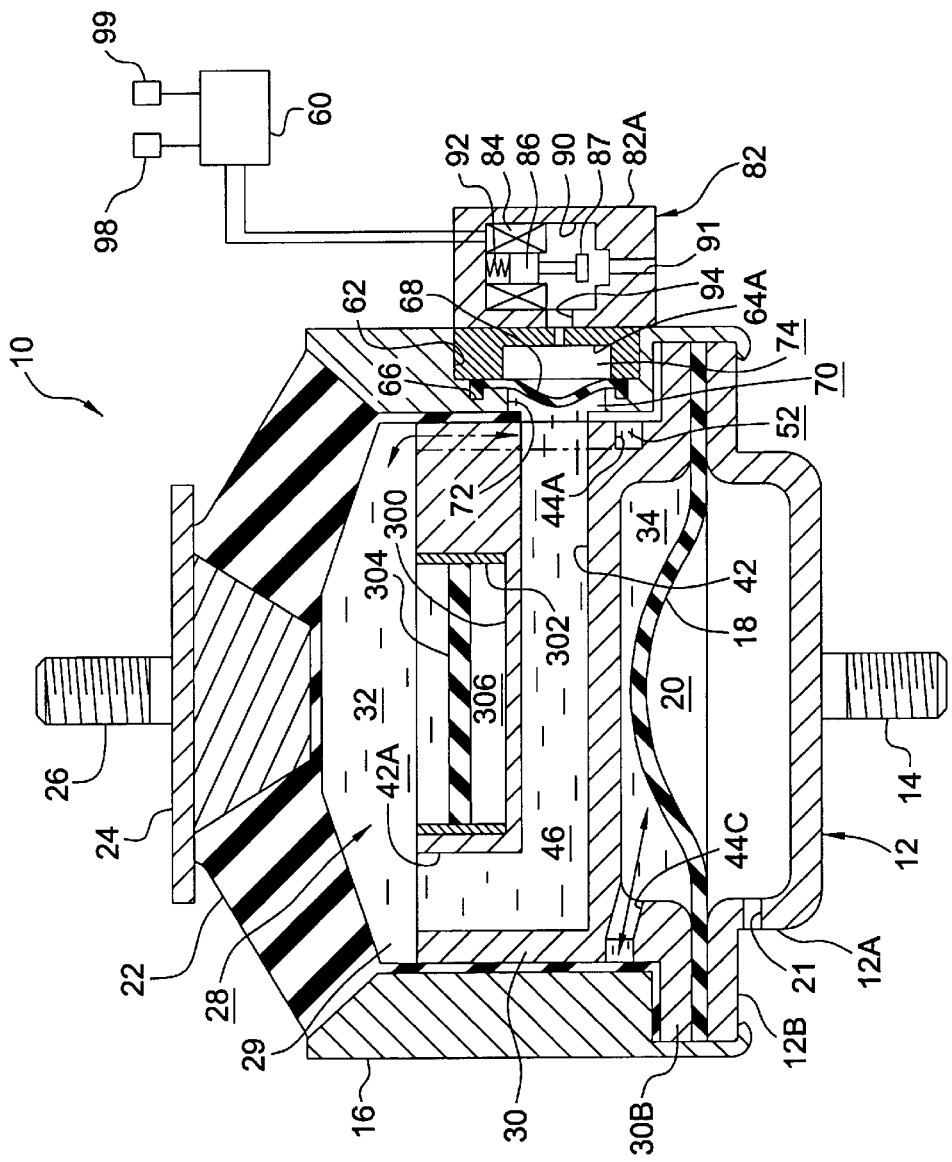
FIG. 8 is a sectional view of a vibration isolating apparatus relating to a fourth preferred embodiment of the present invention.

As illustrated in FIG. 8, the outer tube 16 of the vibration isolating apparatus 10 relating to the present embodiment is formed as a thick circular tube, and a portion of the lower portion thereof is thin. A flange 30B is provided at the lower portion of the orifice member 30 of the vibration isolating apparatus 10.

Further, the flange 30B of the orifice member 30 and the peripheral edge portion of the first diaphragm 18 are sandwiched between the flange portion 12B of the bottom plate 12 and the bottom edge portion of the thick portion of the outer tube 16, and are fixed to the thin portion of the outer tube 16 by caulking.

A concave portion 62 is formed at a position of the outer peripheral side of the outer tube 16 which position corresponds to the rectangular hole 42 of the orifice member 30. The concave portion 62 is closed by a block 64. A through hole 72 is formed in the bottom portion of the concave portion 62, and communicates with the rectangular hole 42.

An annular concave portion 66 is formed at the bottom portion of the concave portion 62 at the outer peripheral side of the through hole 72. The peripheral edge portion of the second diaphragm 68 is sandwiched between the annular concave portion 66 and the block 64. In a free state, the second diaphragm 68 protrudes substantially hemispherically toward the through hole 72. The through hole 72 is closed by the second diaphragm 68 so as to form the second auxiliary fluid chamber 70. A concave portion 64A is formed at the side of the block 64 facing the second diaphragm 68 so that the second air chamber 74 is formed between the concave portion 64A and the second diaphragm 68. Further, the second air chamber 74 and the switching valve 82 communicate by a hole 94 formed in the block 64.

A concave portion 300 is formed in the center of the main fluid chamber 32 side of the orifice member 30. A diaphragm fixing pipe 302 is inserted into and fixed to the concave portion 300.

The outer periphery of a circular-plate-shaped third diaphragm 304 is bonded by vulcanization to the axial direction intermediate portion of the inner peripheral surface of the diaphragm fixing pipe 302. The space between the third diaphragm 304 and the bottom portion of the concave portion 300 is a third air chamber 306 which does not communicate with the outside air.

In the present embodiment, the respective rigidities of the first diaphragm 18, the second diaphragm 68 and the third diaphragm 304 become larger in that order.

Next, operation of the present embodiment will be described.

When shake vibration is generated, the control circuit 60 does not apply voltage to the coil 84. In this way, the plunger 86 is urged by the spring 92, the valve element 87 closes the air hole 91, and the switching valve 82 is in a closed state in which the space between the second air chamber 74 and the outside air is closed. As a result, because the air within the second air chamber 74 functions as an air spring, the rigidity of the second diaphragm 68 increases.

The shake vibration is effectively absorbed by the resistance at the time that the fluid 29 passes through the first restricting passage 52. When shake vibration is generated, the second diaphragm 68 and the third diaphragm 304 which have high rigidities hardly deform at all, and there is hardly any flow of the fluid 29 in the second restricting passage 46.

Further, when idle vibration is generated, the first restricting passage 52 becomes clogged. As a result, the fluid 29 moves reciprocally between the main fluid chamber 32 and the second auxiliary fluid chamber 70 through the second restricting passage 46, and fluid-column resonance is generated within the second restricting passage 46. When idle vibration is generated, the third diaphragm 304 having high rigidity hardly deforms at all.

Here, due to the vehicle speed sensor 98 and the engine rotational frequency sensor 99, the control circuit 60 determines whether the frequency of the vibration is on the low end or the high end of idle vibration. When the control circuit 60 determines that the frequency of the vibration is on the low end, the control circuit 60 applies voltage to the coil 84 of the switching valve 82, and the plunger 86 is attracted. In this way, the valve element 87 moves apart from the air hole 91, and the second air chamber 74 communicates with the outside air. The rigidity of the second diaphragm 68 is low as compared to a case in which the second air chamber 74 is in a closed state. The dynamic spring constant of the vibration isolating apparatus 10 in the frequency range of low-frequency idle vibration decreases, and the low-frequency idle vibration is reliably absorbed.

When it is determined that the frequency of the vibration is on the high end of idle vibration, the control circuit 60 stops the application of voltage to the coil 84. In this way, the plunger 86 is urged by the spring 92, the valve element 87 closes the air hole 91, and the second air chamber 74 is closed. As a result, the rigidity of the second diaphragm 68 increases, and the fluid-column resonance frequency at the second restricting passage 46 moves to the high frequency side. The dynamic spring constant of the vibration isolating apparatus 10 in the frequency region of high-frequency idle vibration decreases, and the high-frequency idle vibration is reliably absorbed.

When high-frequency vibration is generated, the second restricting passage 46 becomes clogged. The third diaphragm 304 deforms, and a rise in pressure of the fluid within the main fluid chamber 32 is suppressed. Therefore, a rise in the dynamic spring constant is suppressed, and high-frequency vibration can be absorbed.

In this way, in the vibration isolating apparatus 10 of the present embodiment, in the same way as the vibration isolating apparatus 10 of the third embodiment, both low-frequency idle vibration and high-frequency idle vibration can be addressed by the second air chamber 74 being open or not being open to the outside air.

Next, a fifth preferred embodiment of the present invention will be described on the basis of FIG. 9. Structures which are the same as those of the first preferred embodiment are denoted by the same reference numerals, and description thereof is omitted.

Figure 9:
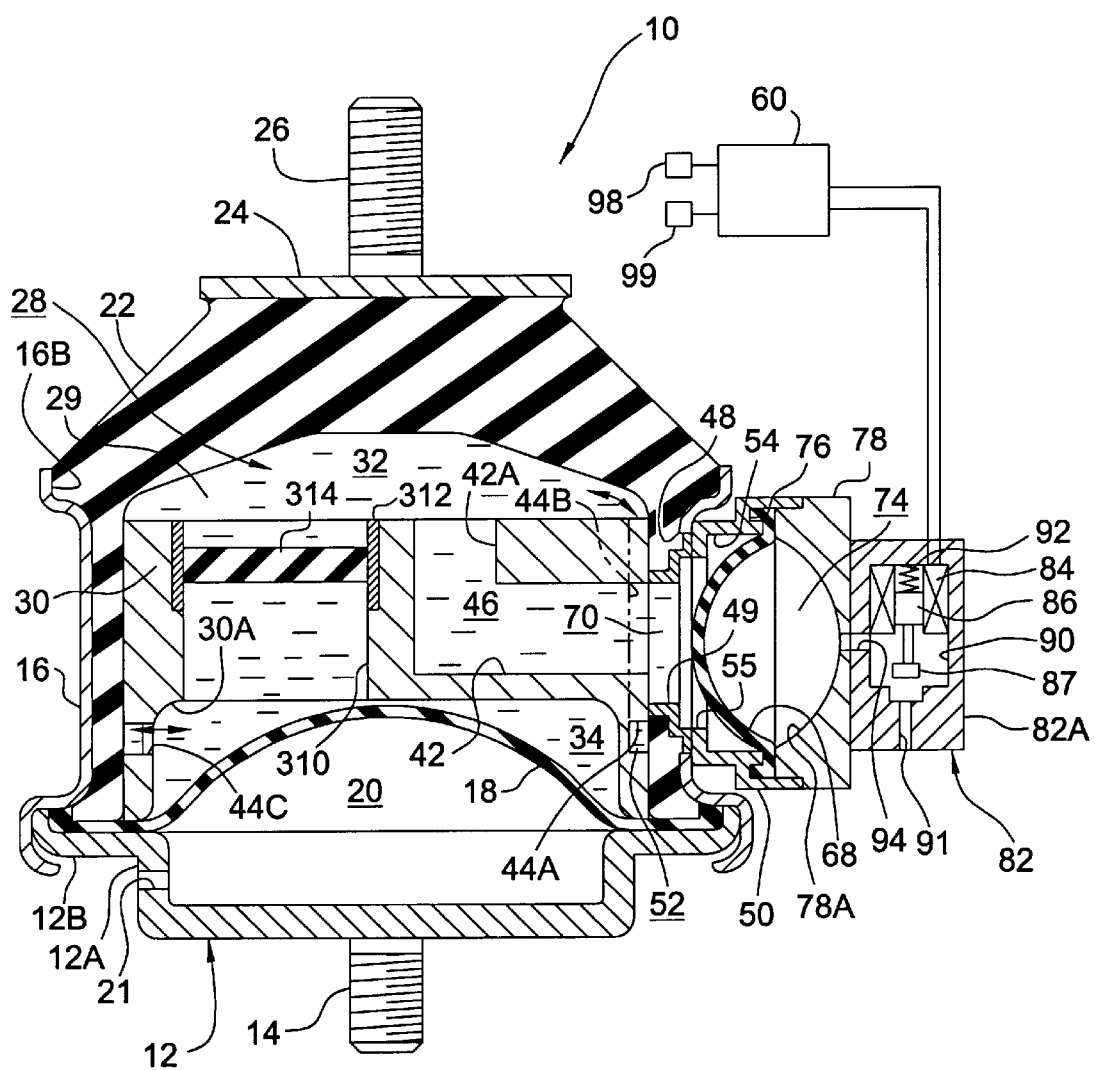
FIG. 9 is a sectional view of a vibration isolating apparatus relating to a fifth preferred embodiment of the present invention.

As illustrated in FIG. 9, the vibration isolating apparatus 10 of the fifth embodiment is structured substantially similarly to the first embodiment. However, in the fifth embodiment, a through hole 310, which penetrates between the main fluid chamber 32 and the first auxiliary fluid chamber 34, is formed in the orifice member 30. A membrane fixing pipe 312 is inserted into and fixed to the through hole 310. The outer periphery of a circular-plate-shaped membrane 314 is bonded by vulcanization to the axial direction intermediate portion of the inner peripheral surface of the membrane fixing pipe 312.

In the present embodiment, the respective rigidities of the first diaphragm 18, the second diaphragm 68 and the membrane 314 become greater in that order.

Operation of the fifth preferred embodiment will now be described.

When shake vibration is generated and when idle vibration is generated, the vibration is absorbed in the same way as in the first embodiment through the fourth embodiment.

When high-frequency vibration is generated, the second restricting passage 46 becomes clogged. The membrane 314 deforms, and a rise in pressure in the main fluid chamber 32 is suppressed even more than by the third diaphragm 304 of the fourth embodiment. Therefore, a rise in the dynamic spring constant is suppressed even more, and the high-frequency vibration can be absorbed.

Next, a sixth preferred embodiment of the present invention will be described on the basis of FIGS. 10 and 11. Structures which are the same as those of the previously-described embodiments are denoted by the same reference numerals, and description thereof is omitted.

Figure 10:
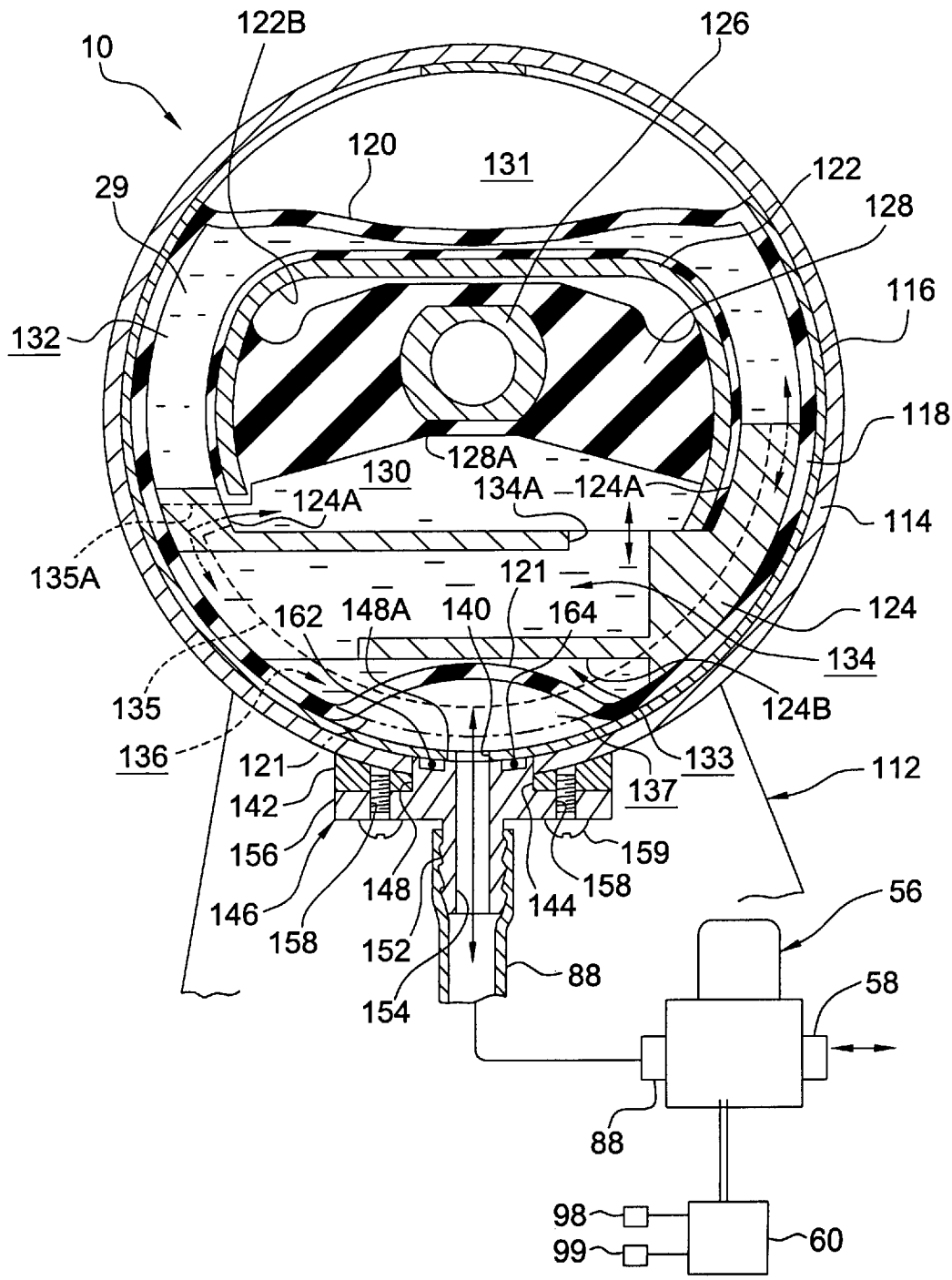
FIG. 10 is a sectional view of a vibration isolating apparatus relating to a sixth preferred embodiment of the present invention.
Figure 11:
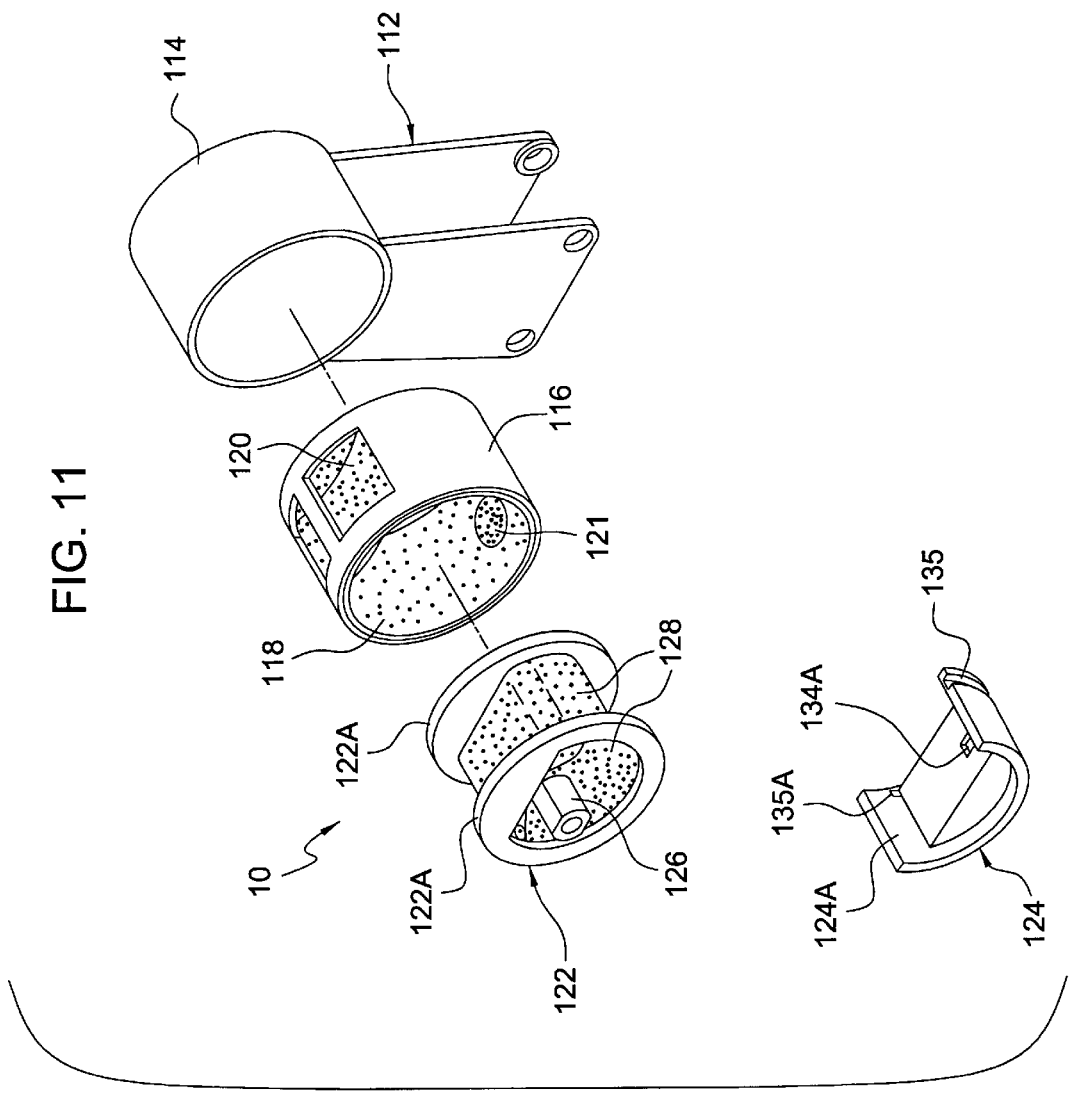
FIG. 11 is an exploded perspective view of the vibration isolating apparatus relating to the sixth preferred embodiment of the present invention.

As illustrated in FIGS. 10 and 11, the vibration damping apparatus 10 of the present embodiment is provided with a mounting frame 112 for mounting to an unillustrated vehicle body. An outer tube 116 is inserted into an annular portion 114 of the mounting frame 112. A thin rubber layer 118 is bonded by vulcanization to the inner side of the outer tube 116. A portion of the thin rubber layer 118 at the upper side thereof forms a first diaphragm 120 which is separated from the inner peripheral surface of the outer tube 116. A portion of the lower side of the thin rubber layer 118 forms a second diaphragm 121 which is formed so as to be separated from the inner peripheral surface of the outer tube 116 and so as to protrude in the form of a substantially hemispherical surface.

The space between the first diaphragm 120 and the outer tube 116 is a first air chamber 131 which communicates with the exterior when necessary. A second air chamber 137 is formed between the second diaphragm 121 and the outer tube 116.

An intermediate block 122 and an intermediate block 124 are inserted in the interior of the outer tube 116. A flange portion 122A is formed at each of the axial direction end portions of the intermediate block 122. The outer peripheral surfaces of the flange portions 122A fit tightly to the thin rubber layer 118. The intermediate block 124 is fit between the flange portions 122A. As seen from the axial direction of the outer tube 116, the intermediate block 124 has a substantially semicircular block shape, and the outer peripheral surface thereof fits tightly to the thin rubber layer 118.

A notch portion 122B is formed in the central portion of the intermediate block 122 facing the intermediate block 124. An inner tube 126 penetrates through the interior of the intermediate block 122. The inner tube 126 is disposed coaxially with the outer tube 116. An elastic body 128 spans between the inner tube 126 and the intermediate block 122. In this way, the inner tube 126 can be moved relatively to the outer tube 116.

A portion of the outer peripheral surface of the elastic body 128 fits tightly to a top surface 124A of the intermediate block 124. A cut-out portion 128A, which forms a main fluid chamber 130 between the elastic body 128 and the intermediate block 124, is formed in an intermediate portion of the elastic body 128. Further, a first auxiliary fluid chamber 132, which is defined by the intermediate block 122, the intermediate block 124, the thin rubber layer 118 and the first diaphragm 120, is formed between the flange portions 122A of the intermediate block 122.

A through path 135 is formed in the outer periphery of the intermediate block 124. One end of the through path 135 is connected to the first auxiliary fluid chamber 132, whereas the other end of the through path 135 is connected to the main fluid chamber 130 via an opening 135A. The through path 135 is enclosed by the outer tube 116 so as to form a first restricting passage 136 for absorbing shake vibration.

A cut-out portion 124B is formed in the lower portion of the intermediate block 124. The cut-out portion 124B is enclosed by the thin rubber layer 118 and the second diaphragm 121 so as to form a second auxiliary fluid chamber 133. A second restricting passage 134 for absorbing idle vibration is formed in the intermediate block 124. One end of the second restricting passage 134 is connected to the second auxiliary fluid chamber 133, whereas the other end thereof is connected to the main fluid chamber 130 via an opening 134A formed in the inner peripheral portion of the intermediate block 124.

The fluid 29 such as ethylene glycol is filled in the main fluid chamber 130, the first auxiliary fluid chamber 132, the second auxiliary fluid chamber 133, the second restricting passage 134 and the first restricting passage 136.

A circular hole 140, which serves as an opening portion and which communicates the interior and exterior of the outer tube 116, is formed at a portion of the outer tube 116 corresponding to the second air chamber 137. A boss 142 is fixed to the outer peripheral surface side of the annular portion 114 coaxially with the circular hole 140. A large-diameter hole 144, whose diameter is larger than that of the circular hole 140, is formed in the boss 142 and the annular portion 114 coaxially with the circular hole 140.

A connecting fitting 146 is mounted to the boss 142. A circular-column-shaped protruding portion 148, whose diameter is slightly smaller than that of the large-diameter hole 144, is formed on the outer tube 116 side of the connecting fitting 146. A connecting member 152 to which the pipe 88 is connected is provided on the opposite side of the protruding portion 148. A communicating hole 154 is formed in the axially central portion of the connecting portion 152. Further, a flange portion 156 is provided at the intermediate portion of the connecting fitting 146. A pair of mounting holes 158 are formed in the flange portion 156. The connecting fitting 146 is screwed to the boss 142 by screws 159 which are inserted through the mounting holes 158.

An end portion 148A of the protruding portion 148 at the outer tube 116 side is formed in a circular-arc-shape along the outer peripheral surface of the outer tube 116. An annular groove 162 is formed at the outer side portion of the communicating hole 154 of the end portion 148A. An O-ring 164 serving as a sealing member is fit into the annular groove 162. The O-ring 164 is fit tightly to the annular groove 162 and to the outer peripheral surface of the outer tube 116, and is compressed a predetermined amount.

One end of the pipe 88 is connected to the connecting portion 152, whereas the other end of the pipe 88 is connected to the two-port/two-position switching valve 56.

In the present embodiment, the passage length of the first restricting passage 136 is longer than that of the second restricting passage 134. The passage cross-sectional area of the second restricting passage 134 is greater than that of the first restricting passage 136. Further, the rigidity of the second diaphragm 121 is greater than that of the first diaphragm 120.

In the present embodiment, the fluid-column resonance frequency at the second restricting passage 134 can be varied by varying the value of the rigidity of the second diaphragm 121.

Next, operation of the sixth preferred embodiment will be described.

When shake vibration is generated, the control circuit 60 closes the two-port/two-position switching valve 56, and the space between the second air chamber 74 and the outside air is closed. As a result, because the air within the second air chamber 74 functions as an air spring, the rigidity of the second diaphragm 68 increases.

The shake vibration is effectively absorbed by the resistance at the time that the fluid 29 flows through the first restricting passage 136. When shake vibration is generated, the second diaphragm 121 having high rigidity hardly deforms, and there is hardly any flow of the fluid 29 within the second restricting passage 134.

Further, when idle vibration is generated, the first restricting passage 136 becomes clogged. As a result, the fluid 29 moves reciprocally between the main fluid chamber 132 and the second auxiliary fluid chamber 133 through the second restricting passage 134.

Here, due to the vehicle speed sensor 98 and the engine rotational frequency sensor 99, the control circuit 60 determines whether the frequency of the vibration is on the low end or the high end of idle vibration. When the control circuit 60 determines that the frequency of the vibration is on the low end, the control circuit 60 opens the two-port/two-position switching valve 56 so that the second air chamber 137 communicates with the outside air. In this way, the rigidity of the second diaphragm 121 becomes low. The dynamic spring constant of the vibration isolating apparatus 10 in the frequency range of low-frequency idle vibration decreases, and the low-frequency idle vibration is reliably absorbed.

On the other hand, when it is determined that the frequency of the vibration is on the high end of idle vibration, the control circuit 60 closes the two-port/two-position switching valve 56 so that the second air chamber 137 does not communicate with the outside air. In this way, the rigidity of the second diaphragm 121 becomes high, and the fluid-column resonance frequency at the second restricting passage 134 moves to the high frequency side. The dynamic spring constant of the vibration isolating apparatus 10 in the frequency region of high-frequency idle vibration decreases, and the high-frequency idle vibration is reliably absorbed.

In this way, in the vibration isolating apparatus 10 of the present embodiment, the characteristic can be varied by the second air chamber 137 being open or not being open to the outside air. Because the air in the second air chamber 137 facing the fluid is not sucked by the intake system of the engine, even if the second diaphragm 121 were to break, there would not be any effect whatsoever on the engine.

Next, a seventh preferred embodiment of the present invention will be described in accordance with FIG. 12. Structures which are the same as those of the previously-described embodiments are denoted by the same reference numerals, and description thereof is omitted.

Figure 12:
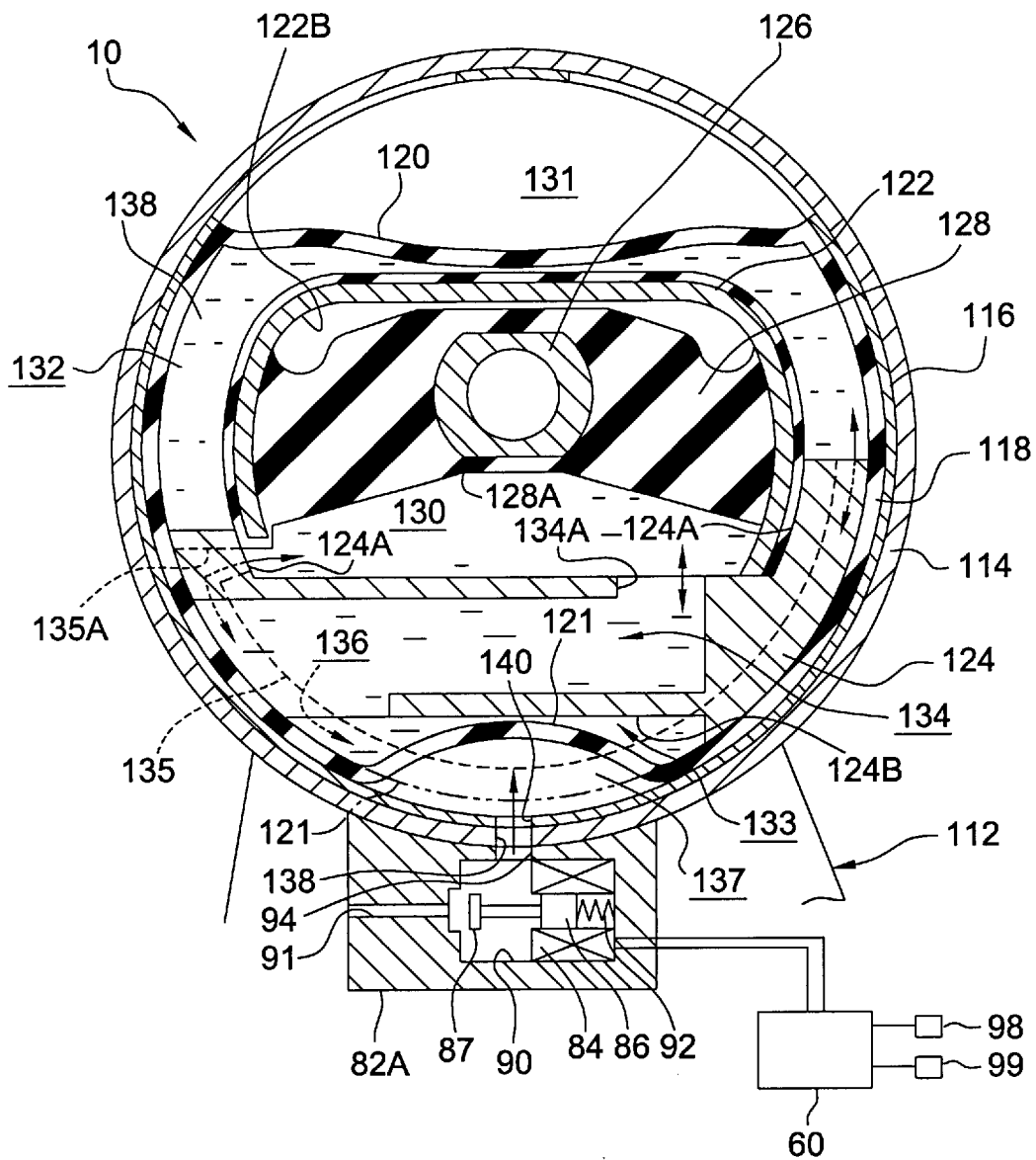
FIG. 12 is a sectional view of a vibration isolating apparatus relating to a seventh preferred embodiment of the present invention.
Figure 13:
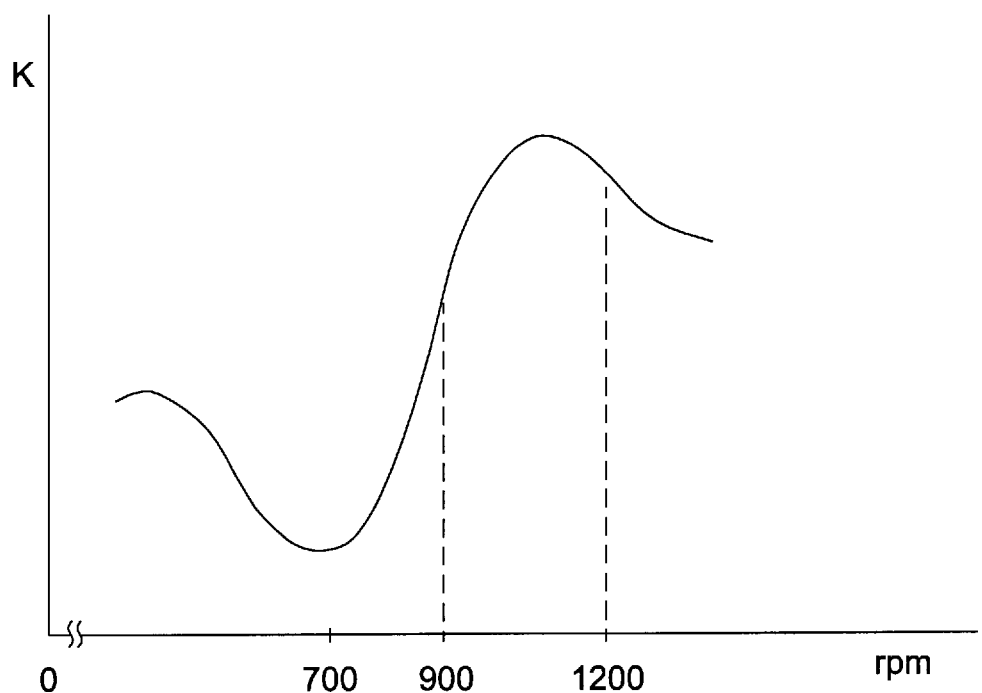
FIG. 13 is a graph illustrating a characteristic of a conventional vibration isolating apparatus.

As illustrated in FIG. 12, the main body portion of the vibration isolating apparatus 10 of the present embodiment is structured similarly to that of the sixth preferred embodiment, and the switching valve 82 is mounted to the outer peripheral surface of the outer tube 116.

Specifically, a small-diameter hole 138 is formed, coaxially with the hole 140 of the outer tube 116, in the annular portion 114 of the vibration isolating apparatus 10 of the seventh embodiment. The hole 94 of the switching valve 82 is positioned so as to correspond to the hole 138. In the present embodiment, the same operation as that of the sixth embodiment is effected by the opening and closing of the switching valve 82, and accordingly, repeat description will be omitted.

Further, in the above-described preferred embodiments, structures are described in which the vibration isolating apparatus 10 is used as an engine mount. However, the present invention is not limited to the same, and the vibration isolating apparatus 10 may be used as a cab mount, a body mount, the support for an ordinary industrial machine, or the like As described above, the vibration isolating apparatus of the present invention has the following excellent effects.

First, as a piping hose for supplying to the vibration isolating apparatus the vacuum generated at the engine intake system (intake manifold) is unnecessary, there are no parts costs for a piping hose. Further, an assembly process for guiding and fixing a piping hose within the engine room is unnecessary, and manufacturing costs are reduced.

Second, in the event that the diaphragm were to break, the fluid within the vibration isolating apparatus would not penetrate into the engine.

Third, because the diaphragm is not pulled by the vacuum of the intake system of the engine and is not made to fit tightly against the inner wall of the air chamber, the dimension between the vibration receiving portion and the vibration generating portion does not vary even if the characteristic is switched.

Fourth, vibration can be reliably reduced even when the engine is started.

What is claimed is:

1. A vibration isolating apparatus comprising:
   a first mounting member connected to one of a vibration generating portion and a vibration receiving portion;
   a second mounting member connected to the other of the vibration generating portion and the vibration receiving portion;
   an elastic body provided between said first mounting member and said second mounting member and deforming when vibration is generated;
   a main fluid chamber filled with fluid, said elastic body forming a portion of a partitioning wall of said main fluid chamber such that said main fluid chamber is able to expand and contract;
   a first auxiliary fluid chamber disposed so as to be separated from said main fluid chamber;
   a first restricting passage communicating said main fluid chamber and said first auxiliary fluid chamber;
   a second auxiliary fluid chamber disposed so as to be separated from said main fluid chamber;
   a second restricting passage communicating said main fluid chamber and said second auxiliary fluid chamber;
   a first diaphragm forming a portion of a partitioning wall of said first auxiliary fluid chamber;
   a second diaphragm forming a portion of a partitioning wall of said second auxiliary fluid chamber;
   an air chamber disposed in opposition to said second auxiliary fluid chamber with said second diaphragm being interposed between said air chamber and said second auxiliary fluid chamber, said air chamber being filled with air; and
   a switching valve consisting essentially of a two-port, two-position switching valve, having an opening which when open, communicates said air chamber with outside air, and when closed, closes said air chamber off from the outside air, the switching valve having a valve element which can close the opening through assistance of air pressure entering from an air chamber side.

2. A vibration isolating apparatus according to claim 1, wherein said switching valve has a movable core which is connected to and formed integrally with a valve element, an elastic member urging the valve element in a direction of closing space between said air chamber and the outside air, and a coil which, when voltage is applied thereto, moves the movable core in a direction of opening the space between said air chamber and the outside air.

3. A vibration isolating apparatus according to claim 1, wherein said first restricting passage and said first diaphragm reduce vibration in a shake vibration region.

4. A vibration isolating apparatus according to claim 1, wherein said second restricting passage and said second diaphragm reduce vibration in an idle vibration region.

5. A vibration isolating apparatus according to claim 1, wherein a partitioning member is disposed between said main fluid chamber and said first auxiliary fluid chamber and seperates said main fluid chamber and said first auxiliary fluid chamber, a third chamber diaphragm which reduces high-frequency vibration being disposed at the partitioning member.

6. A vibration isolating apparatus according to claim 5, wherein said vibration isolating apparatus has a third air chamber filled with air, said third diaphragm forming a portion of a partitioning wall of said third air chamber.

7. A vibration isolating apparatus according to claim 5, wherein said third diaphragm is a membrane, and the membrane forms a partitioning wall between said main fluid chamber and said first auxiliary fluid chamber.

8. A vibration isolating apparatus according to claim 1, wherein a partitioning member is disposed between said main fluid chamber and said first auxiliary fluid chamber and separates said main fluid chamber and said first auxiliary fluid chamber, and said second restricting passage is formed within the partitioning member.

9. A vibration isolating apparatus comprising:
   a first mounting member connected to one of a vibration generating portion and a vibration receiving portion;
   a second mounting member connected to the other of the vibration generating portion and the vibration receiving portion;
   an elastic body provided between said first mounting member and said second mounting member and deforming when vibration is generated;
   a main fluid chamber filled with fluid, said elastic body forming a portion of a partitioning wall of said main fluid chamber such that said main chamber is able to expand and contract;
   a first auxiliary fluid chamber disposed so as to be separate from said main fluid chamber;
   a first restricting passage communicating said main fluid chamber and said first auxiliary chamber;
   a second auxiliary fluid chamber disposed so as to be separated from said main fluid chamber;
   a second restricting passage communicating said main fluid chamber and said auxiliary fluid chamber, a passage cross-sectional area of said second restricting passage being greater than a passage cross-sectional area of said first restricting passage and/or a passage length of said second restricting passage being shorter than a passage length of said first restricting passage;
   a first diaphragm forming a portion of a partitioning wall of said first auxiliary fluid chamber;
   a second diaphragm forming a portion of a partitioning wall of said second auxiliary fluid chamber;
   an air chamber disposed in opposition to said second auxiliary fluid chamber with said second diaphragm being interposed between said air chamber and said second auxiliary fluid chamber, said air chamber being filled with air; and
   a switching valve consisting essentially of a two-port, two-position switching valve having an opening which communicates said air chamber and outside air, and having a valve element which can close the opening, the valve element closing the opening through assistance of air pressure, which enters from an air chamber side.

10. A vibration isolating apparatus according to claim 6, wherein said switching valve has a movable core which is connected to and formed integrally with the valve element, an elastic member urging the valve element in a direction of closing the opening, and a coil which, when voltage is applied thereto, moves the movable core in a direction of moving apart from the opening.

11. A vibration isolating apparatus according to claim 9, wherein a partitioning member is disposed between said main fluid chamber and said first auxiliary fluid chamber and separates said main fluid chamber and said first auxiliary fluid chamber, a third diaphragm which reduces high-frequency vibration being disposed at the partitioning member.

12. A vibration isolating apparatus according to claim 11, wherein said vibration isolating apparatus has a third air chamber filled with air, said third diaphragm forming a portion of a partitioning wall of said third air chamber.

13. A vibration isolating apparatus according to claim 11, wherein said third diaphragm is a membrane, and the membrane forms a partitioning wall between said main fluid chamber and said first auxiliary fluid chamber.

14. A vibration isolating apparatus according to claim 9, wherein a partitioning member is disposed between said main fluid chamber and said first auxiliary fluid chamber and separates said main fluid chamber and said first auxiliary fluid chamber, and said second restricting passage is formed within the partitioning member.

15. A vibration isolating apparatus comprising:
- a first mounting member connected to one of an engine and a vehicle body;
- a second mounting member connected to the other of the engine and the vehicle body;
- an elastic body provided between said first mounting member and said second mounting member and deforming when vibration is generated;
- a main fluid chamber filled with fluid, said elastic body forming a portion of a partitioning wall of said main fluid chamber such that said main fluid chamber is able to expand and contract;
- a first auxiliary fluid chamber able to expand and contract, and communicating with said main fluid chamber via a first restricting passage;
- a second auxiliary fluid chamber communicating with said main fluid chamber via a second restricting passage;
- a diaphragm which is deformable and which forms a portion of a partitioning wall of said second auxiliary fluid chamber;
- an air chamber disposed in opposition to said second auxiliary fluid chamber with said diaphragm being interposed between said air chamber and said second auxiliary fluid chamber, said air chamber being filled with air;
- a switching valve consisting essentially of a two-port, two-position switching valve having an opening adapted to assume an open state in which said air chamber communicates with outside air, and a closed state in which said air chamber is closed off from the outside air, the switching valve having a valve element that closes the opening through assistance of air pressure entering from an air chamber side;
- a sensor for detecting a frequency of vibration generated by the engine; and
- control means for, on the basis of signals from said sensor, setting said switching valve in the open state when it is determined that the frequency of the vibration generated by the engine falls in a range of idle frequency, and setting said switching valve in the closed state when it is determined that the frequency of the vibration generated by the engine exceeds the range of idle frequency.

16. A vibration isolating apparatus according to claim 15, wherein said control means controls said switching valve to set said switching valve in the closed state when the engine starts.

17. A vibration isolating apparatus according to claim 15, wherein a partitioning member is disposed between said main fluid chamber and said first auxiliary fluid chamber and separates said main fluid chamber and said first auxiliary fluid chamber, a third diaphragm which reduces high-frequency vibration being disposed at the partitioning member.

18. A vibration isolating apparatus according to claim 17, wherein said vibration isolating apparatus has a third air chamber filled with air, said third diaphragm forming a portion of a partitioning wall of said third air chamber.

19. A vibration isolating apparatus according to claim 17, wherein said third diaphragm is a membrane, and the membrane forms a partitioning wall between said main fluid chamber and said first auxiliary fluid chamber.

20. A vibration isolating apparatus according to claim 15, wherein a partitioning member is disposed between said main fluid chamber and said first auxiliary fluid chamber and separates said main fluid chamber and said first auxiliary fluid chamber, and said second restricting passage is formed within the partitioning member.

* * * * *